(12) United States Patent
Segawa et al.

(10) Patent No.: US 12,467,382 B2
(45) Date of Patent: Nov. 11, 2025

(54) TURBINE WITH BIASED NOZZLE VANE MEMBERS

(71) Applicant: IHI Corporation, Tokyo (JP)

(72) Inventors: Kenichi Segawa, Tokyo (JP); Hayato Shibayama, Tokyo (JP); Takao Asakawa, Tokyo (JP); Kengo Ikeda, Tokyo (JP); Naotoshi Shimizu, Tokyo (JP); Taiki Yoshizaki, Tokyo (JP); Ryosuke Miyao, Tokyo (JP)

( * ) Notice: Subject to any disclaimer, the term of this patent is extended or adjusted under 35 U.S.C. 154(b) by 0 days.

(21) Appl. No.: 18/959,629

(22) Filed: Nov. 26, 2024

(65) Prior Publication Data

US 2025/0084772 A1     Mar. 13, 2025

Related U.S. Application Data

(60) Division of application No. 18/509,325, filed on Nov. 15, 2023, now abandoned, which is a continuation of
(Continued)

(30) Foreign Application Priority Data

Jun. 8, 2021   (JP) .................................. 2021-095685

(51) Int. Cl.
   *F01D 17/16*      (2006.01)
   *F01D 9/04*       (2006.01)
(52) U.S. Cl.
   CPC ............. *F01D 17/16* (2013.01); *F01D 9/04* (2013.01); *F05D 2220/40* (2013.01); *F05D 2240/128* (2013.01); *F05D 2260/60* (2013.01)

(58) Field of Classification Search
   CPC .......... F01D 17/16; F01D 9/04; F01D 17/165; F05D 2220/40; F05D 2240/128; F05D 2260/60; F05D 2260/38; F02B 37/24
   See application file for complete search history.

(56) References Cited

U.S. PATENT DOCUMENTS 1,988,163 A * 1/1935 Church ................. F04D 29/466
                                                                    417/323
9,739,165 B2 * 8/2017 Uesugi .................. F01D 17/165
(Continued)

FOREIGN PATENT DOCUMENTS

DE     102008000776     8/2009
DE     102009007663     8/2010
(Continued)

OTHER PUBLICATIONS

International Search Report dated Jul. 19, 2022 for PCT/JP2022/019082.
(Continued)

*Primary Examiner* — Jesse S Bogue
(74) *Attorney, Agent, or Firm* — SOEI PATENT & LAW FIRM

(57) ABSTRACT

A turbine includes a turbine wheel, a housing having a flow path for a gas, a variable geometry device to guide the gas from the flow path to the turbine wheel, and a biasing member. The variable geometry device includes one or more nozzle vane member, each having a nozzle vane, a nozzle shaft and a nozzle link plate. The biasing member is in contact with the nozzle link plate of the nozzle vane member.

20 Claims, 14 Drawing Sheets

Related U.S. Application Data application No. PCT/JP2022/019082, filed on Apr. 27, 2022.

(56) References Cited

U.S. PATENT DOCUMENTS

| | | | |
|---|---|---|---|
| 10,161,305 | B2 | 12/2018 | Ikegami et al. |
| 10,309,248 | B2 | 6/2019 | Ueda et al. |
| 10,465,601 | B2 | 11/2019 | Ikeda et al. |
| 10,612,411 | B2 | 4/2020 | Nishioka et al. |
| 10,731,503 | B2 | 8/2020 | Yoshida et al. |
| 10,858,952 | B2 | 12/2020 | Asakawa et al. |
| 10,907,496 | B2 * | 2/2021 | Shioya .................. F02C 6/12 |
| 11,168,579 | B2 * | 11/2021 | Ehrhard ................ F02B 37/00 |
| 2009/0092483 | A1 * | 4/2009 | Yasui .................... F01D 17/165 |
| | | | 415/159 |
| 2010/0196146 | A1 | 8/2010 | Wengert et al. |
| 2010/0310363 | A1 * | 12/2010 | Matsuyama .......... F01D 17/165 |
| | | | 415/212.1 |
| 2011/0038742 | A1 | 2/2011 | Fleig et al. |
| 2014/0212306 | A1 | 7/2014 | Fleig et al. |
| 2014/0311159 | A1 | 10/2014 | Ikegami et al. |

FOREIGN PATENT DOCUMENTS

| | | | |
|---|---|---|---|
| EP | 2233718 | 9/2010 | |
| JP | S63-014843 | 1/1988 | |
| JP | H10-121905 | 5/1998 | |
| JP | 2004-278532 | 10/2004 | |
| JP | 2004278532 A * | 10/2004 | ............... F01D 9/04 |
| JP | 2006-207534 | 8/2006 | |
| JP | 2006-266186 | 10/2006 | |
| JP | 2009-144546 | 7/2009 | |
| JP | 2012-167640 | 9/2012 | |
| JP | 2017-067033 | 4/2017 | |

OTHER PUBLICATIONS

International Preliminary Report on Patentability with Written Opinion dated Dec. 21, 2023 for PCT/JP2022/019082.

* cited by examiner

TURBINE WITH BIASED NOZZLE VANE MEMBERS

CROSS-REFERENCE TO RELATED APPLICATIONS

This application is a divisional application of U.S. application Ser. No. 18/509,325 filed on Nov. 15, 2023, which is a continuation application of PCT Application No. PCT/JP2022/019082, filed on Apr. 27, 2022, which claims the benefit of priority from Japanese Patent Application No. 2021-095685, filed on Jun. 8, 2021, the entire contents of which are incorporated herein by reference.

BACKGROUND

Japanese Unexamined Patent Publication No. 2006-207534 discloses a turbocharger including a variable geometry mechanism. The variable geometry mechanism controls the flow rate of exhaust gas supplied from a scroll flow path to a turbine.

The variable geometry mechanism adjusts the flow rate of the exhaust gas by adjusting the angle of nozzle vanes to change the cross-sectional area of the flow path through which the exhaust gas flows.

In turbochargers with a variable geometry mechanism, an irregular external force applied to the variable geometry mechanism may reduce the reliability in the operation of the turbine.

For example, since the variable geometry mechanism is disposed on a path that guides the exhaust gas discharged from an engine to a turbine wheel, and that the state of the exhaust gas varies depending on the operating state of the engine, components that form the variable geometry mechanism may be affected by the changes in the state of the exhaust gas.

The components that form the variable geometry mechanism may also be affected by vibrations or shock imparted on the turbine.

SUMMARY

An example turbine includes a turbine wheel; a housing including a flow path through which gas received from an inlet port flows; a variable geometry mechanism (or variable geometry device) disposed inside the housing, and configured to receive the gas from the flow path and guide the gas to the turbine wheel, the variable geometry mechanism having a disc-shaped nozzle ring having a main surface facing the turbine wheel and a rear surface, and nozzle vane units (or nozzle vane devices) each including a nozzle vane disposed on a side of the main surface of the nozzle ring, a nozzle shaft extending from the nozzle vane and passing through the nozzle ring, and a nozzle link plate disposed on a side of the rear surface of the nozzle ring and connected to a distal end of the nozzle shaft; and a biasing member being in contact with the nozzle vane units, and applying a biasing force in an axial direction of the nozzle shaft. The nozzle vane abuts against a portion (or surface portion or contact surface) facing the nozzle vane by the biasing force.

DETAILED DESCRIPTION

Figure 1:
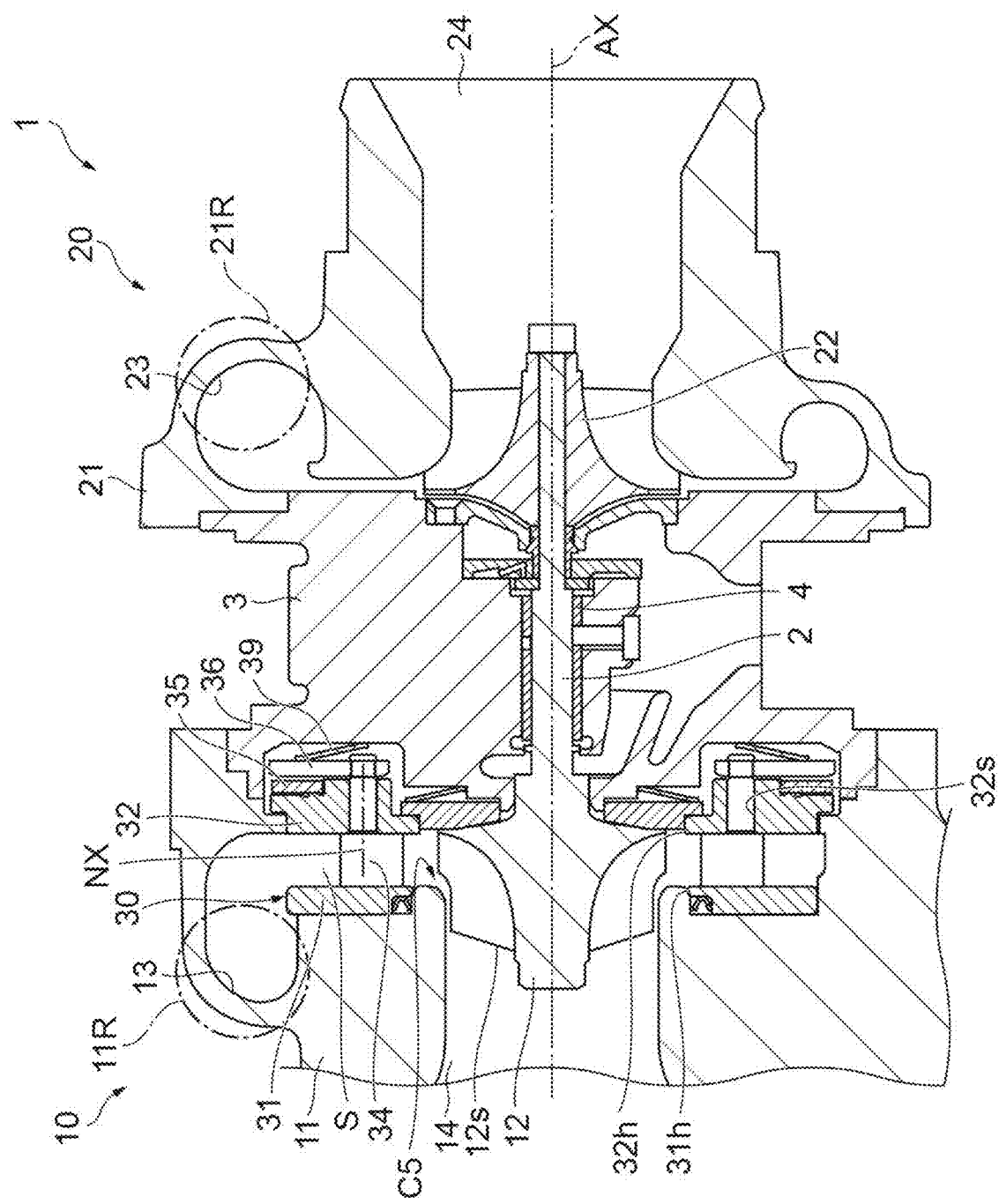
FIG. 1 is a cross-sectional view of an example turbocharger including an example turbine.

An example turbine includes a turbine wheel; a housing including a flow path through which gas received from an inlet port flows; a variable geometry mechanism (or variable geometry device) disposed inside the housing, and configured to receive the gas from the flow path and guide the gas to the turbine wheel, the variable geometry mechanism having a disc-shaped nozzle ring having a main surface facing the turbine wheel and a rear surface, and nozzle vane units (or nozzle vane devices) each including a nozzle vane disposed on a side of the main surface of the nozzle ring, a nozzle shaft extending from the nozzle vane and passing through the nozzle ring, and a nozzle link plate disposed on a side of the rear surface of the nozzle ring and connected to a distal end of the nozzle shaft; and a biasing member being in contact with the nozzle vane units, and applying a biasing force in an axial direction of the nozzle shaft. The nozzle vane abuts against a portion (or surface portion or contact surface) facing the nozzle vane by the biasing force.

The example turbine includes the biasing member that applies a biasing force oriented in the axial direction of the nozzle shaft to the nozzle vane units. The nozzle vane units to which the biasing force is applied abut against the portion facing the nozzle vane. Only a rotation about the nozzle shaft is possible as the movement of each nozzle vane unit relative to the nozzle ring. Other movement of the nozzle vane units such as unintended whirling is suppressed. Accordingly, irregular movement of the nozzle vane units does not occur relative to the nozzle ring even if the nozzle vanes receive an irregular external force. The state of the component group that forms the variable geometry mechanism can be maintained favorably, so that a state in which the variable geometry mechanism is capable of exhibiting a desired performance can be maintained. The reliability of the turbine including the variable geometry mechanism can thus be improved.

The variable geometry mechanism may further have a disc member sandwiching the nozzle vane together with the nozzle ring. The portion facing the nozzle vane may be the disc member. The disc member enables a distance from the disc member to the nozzle ring to be precisely set. The disc member also enables a gap formed between the nozzle vane and the disc member to be precisely set. The disc member further enables a biasing force that is capable of suppressing the generation of irregular movement of the nozzle vane to be set without inhibiting rotational movement of the nozzle vane about the nozzle shaft.

The housing may include a flow path surface facing an end surface of the nozzle vane opposite an end surface on which the nozzle shaft is provided. The portion facing the nozzle vane may be the flow path surface of the housing. Such configuration eliminates the need for a separate component with which the nozzle vane comes into contact. Accordingly, the turbine can have a simple configuration.

A distance from the nozzle ring to the nozzle link plate along the axial direction may be greater than a distance from the nozzle vane to the portion facing the nozzle vane along the axial direction. The nozzle vane can be reliably brought into contact with the portion facing the nozzle vane.

The nozzle link plate may include a first region overlapping with the nozzle vane, and a second region not overlapping with the nozzle vane when viewed in the axial direction. A portion at which the biasing member is in contact with the nozzle link plate may be positioned in the first region. In such configuration, the biasing force by the biasing member is applied to a region close to the nozzle shaft. A distance from a connecting portion between the nozzle link plate and the nozzle shaft to the position on the nozzle link plate on which the biasing force acts is reduced. A moment which tries to tilt the nozzle vane unit relative to an axis of rotation of the nozzle shaft is reduced. A frictional force between the nozzle shaft and an inner circumferential surface of a through hole of the nozzle ring is reduced, so that movement of the nozzle vane for controlling a flow path cross-sectional area can be favorably maintained.

The nozzle link plate may include a first region overlapping with the nozzle vane, and a second region not overlapping with the nozzle vane when viewed in the axial direction. The portion at which the biasing member is in contact with the nozzle link plate may be positioned in the second region. In such configuration, the biasing force is applied to a region remote from the nozzle shaft. The distance from the position at which the nozzle shaft is connected to the nozzle link plate to the position on the nozzle link plate on which the biasing force acts is increased. The moment which tries to tilt the nozzle vane unit relative to the axis of rotation of the nozzle shaft is increased. The frictional force created by the nozzle shaft coming into contact with the inner circumferential surface of the through hole of the nozzle ring is increased. Accordingly, movement such as unintended whirling is further suppressed.

Another example turbine includes a turbine wheel; a housing including a flow path through which gas received from an inlet port flows; a variable geometry mechanism (or variable geometry device) disposed inside the housing, and configured to receive the gas from the flow path and guide the gas to the turbine wheel, the variable geometry mechanism having a disc-shaped nozzle ring having a main surface facing the turbine wheel and a rear surface, and nozzle vane units each including a nozzle vane disposed on a side of the main surface of the nozzle ring, a nozzle shaft extending from the nozzle vane and passing through the nozzle ring, and a nozzle link plate disposed on a side of the rear surface of the nozzle ring and connected to a distal end of the nozzle shaft; and a biasing member being in contact with the nozzle vane units, and applying a biasing force in a radial direction of the nozzle shaft. The nozzle shaft abuts against an inner circumferential surface of a through hole of the nozzle ring.

The nozzle shaft abuts against the inner circumferential surface of the through hole of the nozzle ring. As a result, only a rotation about the nozzle shaft is possible as the movement of each nozzle vane unit relative to the nozzle ring. That is, other movement of the nozzle vane units such as unintended whirling is suppressed. Accordingly, irregular movement of the nozzle vane units does not occur even if the nozzle vanes receive an irregular force. The state of the component group that forms the variable geometry mechanism can be maintained favorably, so that the state in which the variable geometry mechanism is capable of exhibiting a desired performance can be maintained. The reliability of the turbine including the variable geometry mechanism can thus be improved.

Another example is a turbocharger including the example turbine above. The example turbocharger includes the example turbine above, so that it is capable of improving the reliability.

Hereinafter, with reference to the drawings, the same elements or similar elements having the same function are denoted by the same reference numerals, and redundant description will be omitted.

As illustrated in FIG. 1, an example turbocharger 1 is a variable geometry type. The turbocharger 1 is applied, for example, to an internal combustion engine of a ship or a vehicle. The turbocharger 1 has a turbine 10 and a compressor 20. The turbine 10 has a turbine housing 11, a turbine wheel 12, a variable geometry mechanism (or variable geometry device) 30, and a bearing housing 3. The compressor 20 has a compressor housing 21 and a compressor wheel 22.

The turbine wheel 12 is provided on a first end portion of a shaft 2. The compressor wheel 22 is provided on a second end portion of the shaft 2. The bearing housing 3 is provided between the turbine housing 11 and the compressor housing 21. A bearing 4 is disposed in the bearing housing 3. The shaft 2 is rotatably supported by the bearing housing 3 via the bearing 4.

The turbine housing 11 has an inlet port 11R, a scroll flow path 13, and an outlet port 14. The inlet port 11R receives exhaust gas discharged from the internal combustion engine into the turbine housing 11. The scroll flow path 13 extends in a circumferential direction about an axis of rotation (or central axis) AX, around the turbine wheel 12. The scroll flow path 13 guides the gas received from the inlet port 11R to the turbine wheel 12. The exhaust gas guided to the turbine wheel 12 via the variable geometry mechanism 30 rotates the turbine wheel 12. After rotating the turbine wheel 12, the exhaust gas flows out of the turbine housing 11 through the outlet port 14.

More specifically, the turbine 10 has a connecting flow path S. The connecting flow path S guides the exhaust gas from the scroll flow path 13 to the turbine wheel 12. The connecting flow path S includes a plurality of nozzles. The plurality of nozzles are formed by a plurality of nozzle vanes 34. More specifically, a nozzle is a space surrounded by a pair of the nozzle vanes 34, a CC plate 31, and a nozzle ring 32 which are described further below. The plurality of nozzle vanes 34 are disposed equidistant from each other on a reference circle about the rotational axis AX. Each nozzle vane 34 rotates about a nozzle axis NX parallel to the axis of rotation AX. A cross-sectional area of the nozzles is adjusted by the rotation of the plurality of nozzle vanes 34. The turbine 10 has the variable geometry mechanism 30 as a mechanism for adjusting the cross-sectional area of the nozzles.

The compressor housing 21 has a scroll flow path 23, a suction port 24, and a discharge port 21R. The compressor wheel 22 rotates along with the rotation of the turbine wheel 12 via the shaft 2. The rotating compressor wheel 22 sucks in outside air through the suction port 24. The air sucked in is compressed by passing through the compressor wheel 22 and the scroll flow path 23. The air is discharged from the discharge port 21R as compressed air. The compressed air is supplied to the internal combustion engine.

The variable geometry mechanism 30 has a clearance control plate and the nozzle ring 32. The clearance control plate is referred to as a "CC plate 31." The CC plate 31 is disc-shaped. The nozzle ring 32 is disc-shaped. A central axis of the CC plate 31 is coincident with a central axis of the nozzle ring 32. The central axis of the CC plate 31 is coincident with the axis of rotation AX. The central axis of the nozzle ring 32 is coincident with the axis of rotation AX. The CC plate 31 is positioned closer to the turbine housing 11 in a direction of the axis of rotation AX. The nozzle ring 32 is positioned closer to the bearing housing 3 in the direction of the axis of rotation AX. The interval between the CC plate 31 and the nozzle ring 32 is the connecting flow path S. The plurality of nozzle vanes 34 are disposed between the CC plate 31 and the nozzle ring 32.

Figure 2:
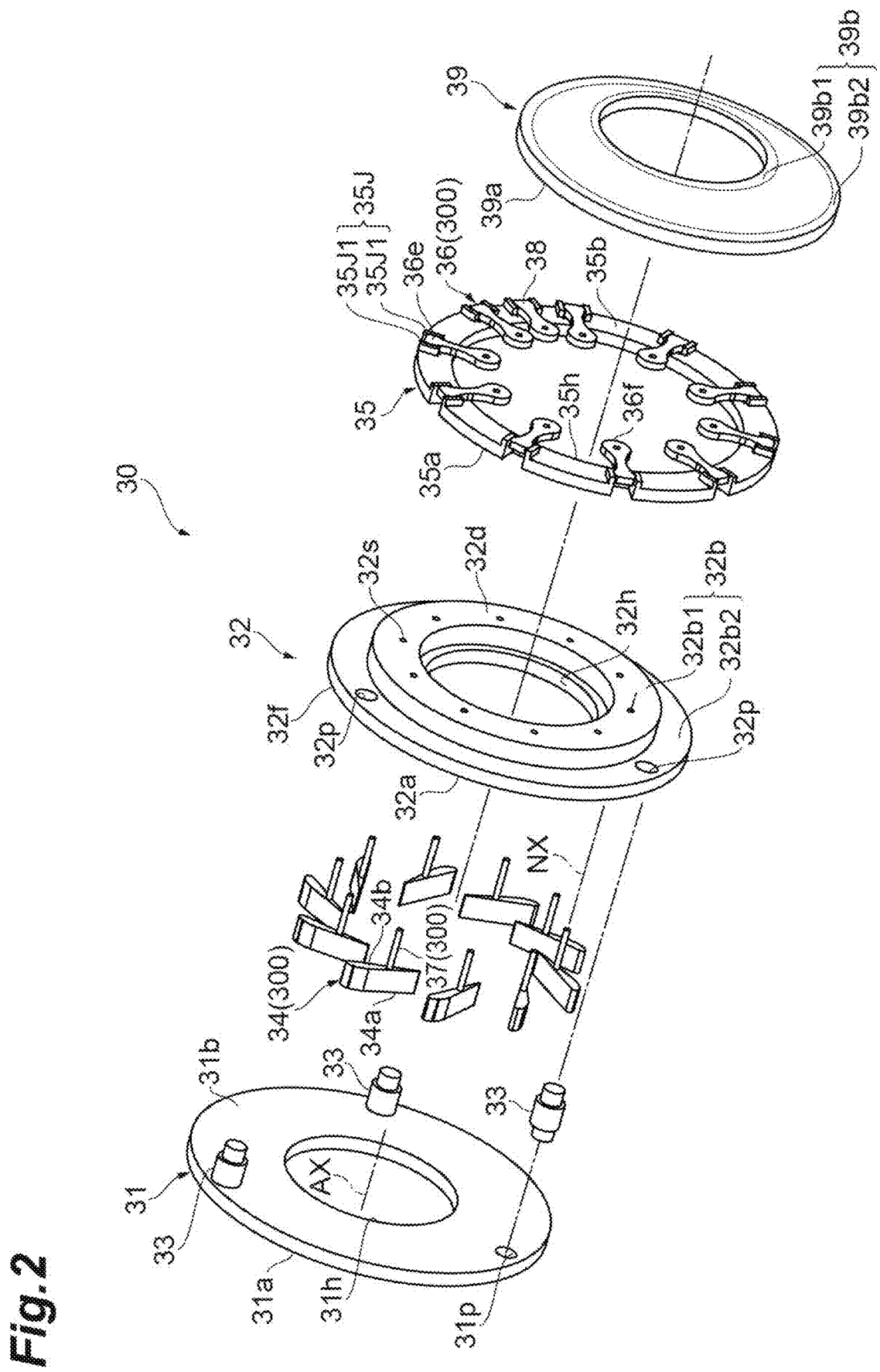
FIG. 2 is an exploded perspective view illustrating a variable geometry mechanism and a biasing member of the example turbocharger shown in FIG. 1.

As illustrated in FIG. 2, the variable geometry mechanism 30 has the CC plate 31, the nozzle ring 32, a clearance control pin, and a drive ring (or drive support) 35. The clearance control pin will be referred to as a "CC pin 33." The variable geometry mechanism 30 also has one or more nozzle vane units (or nozzle vane devices) 300.

The CC plate 31 has a plate main surface 31a, a plate rear surface 31b, and a plate hole 31h. The plate main surface 31a faces an inner surface of the turbine housing 11 (see FIG. 1). The plate rear surface 31b faces the nozzle ring 32. The plate hole 31h is a through hole extending from the plate main surface 31a to the plate rear surface 31b. The CC plate 31 is provided with a plate pin hole 31p. The plate pin hole 31p includes an opening formed at least in the plate rear surface 31b. The CC pin 33 is inserted into the plate pin hole 31p from the opening formed in the plate rear surface 31b.

The nozzle ring 32 has a nozzle ring body 32d and a nozzle ring flange 32f. The nozzle ring body 32d is a cylindrical portion. The nozzle ring body 32d has a plurality of nozzle shaft holes 32s. The nozzle shaft holes 32s are through holes. The intervals between the plurality of nozzle shaft holes 32s in the circumferential direction are equal to one another. The nozzle ring flange 32f protrudes in a radial direction from an outer circumferential side surface of the nozzle ring body 32d. The nozzle ring flange 32f has a flange pin hole 32p. A central axis of the flange pin hole 32p is coincident with a central axis of the plate pin hole 31p.

The nozzle ring 32 has a nozzle ring main surface 32a, a nozzle ring rear surface 32b, and a nozzle ring hole 32h. The nozzle ring main surface 32a faces the CC plate 31. The nozzle ring main surface 32a is oriented in a direction of the turbine wheel 12. The nozzle ring rear surface 32b includes a body rear surface 32b1 and a flange rear surface 32b2. The body rear surface 32b1 is an end surface of the nozzle ring body 32d. The body rear surface 32b1 is oriented toward the bearing housing 3. Openings of the nozzle shaft holes 32s are formed in the body rear surface 32b1. A portion of a nozzle link plate 36 is disposed on the body rear surface 32b1. Accordingly, a portion of the body rear surface 32b1 faces the nozzle link plate 36. The flange rear surface 32b2 is an end surface of the nozzle ring flange 32f. The flange rear surface 32b2 is also oriented toward the bearing housing 3. The drive ring 35 which is described below is disposed on the flange rear surface 32b2. Accordingly, the flange rear surface 32b2 faces the drive ring 35.

The CC pin 33 connects the CC plate 31 to the nozzle ring 32. The CC pin 33 is inserted into the plate pin hole 31p. The CC pin 33 is also inserted into the flange pin hole 32p. The CC pin 33 defines the gap between the CC plate 31 and the nozzle ring 32.

The drive ring (or drive support) 35 is disposed on the nozzle ring flange 32f. More specifically, the drive ring 35 is disposed on the flange rear surface 32b2. The drive ring 35 is a ring-like member about the axis of rotation AX. The drive ring 35 has a drive ring hole 35h. The drive ring 35 surrounds the nozzle ring body 32d disposed in the drive ring hole 35h in the circumferential direction. The drive ring 35 is coaxial with the nozzle ring 32. The drive ring 35 is rotatable about the axis of rotation AX relative to the nozzle ring 32.

The drive ring 35 has a drive ring main surface 35a and a drive ring rear surface 35b. The drive ring main surface 35a faces the nozzle ring 32. More specifically, the drive ring main surface 35a faces the flange rear surface 32b2 of the nozzle ring 32. A plurality of the nozzle link plates 36 are disposed on the drive ring rear surface 35b. A portion of the drive ring rear surface 35b faces the nozzle link plates 36. A drive link plate 38 is also disposed on the drive ring rear surface 35b.

The drive ring 35 includes a joint 35J. The nozzle link plate 36 is fit into the joint 35J. A plurality of the joints 35J are provided equidistant in the circumferential direction. Each joint 35J includes a pair of raised portions 35J1. The raised portions 35J1 protrude from the drive ring rear surface 35b. The raised portions 35J1 protrude toward the bearing housing 3. A link plate distal end 36e of the nozzle link plate 36 is fit between a pair of the raised portions 35J1.

The nozzle vane units 300 each has the nozzle vane 34, a nozzle shaft 37, and the nozzle link plate 36. One nozzle vane unit 300 is disposed for each nozzle shaft hole 32s of the nozzle ring 32. One nozzle vane unit 300 is disposed for each joint 35J of the drive ring 35. The intervals between the nozzle vane units 300 are equal in the circumferential direction.

Figure 3:
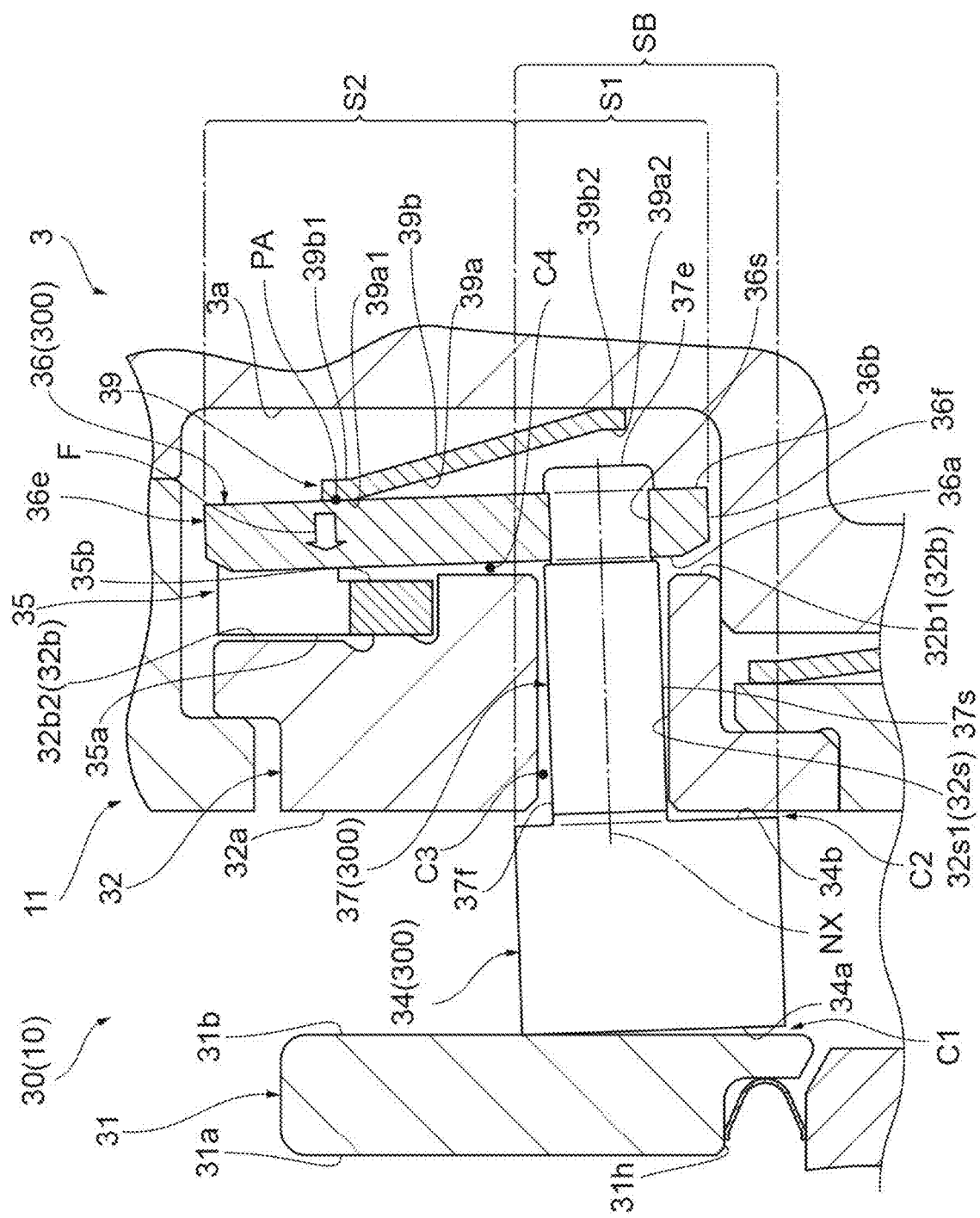
FIG. 3 is an enlarged cross-sectional view of main parts of the variable geometry mechanism and the biasing member of the example turbine.

As illustrated in FIG. 3, the nozzle vane 34 is disposed between the CC plate 31 and the nozzle ring 32. The nozzle vane 34 includes a vane main surface (or free end surface) 34a and a vane rear surface 34b. The vane main surface 34a faces the plate rear surface 31b of the CC plate 31. The vane rear surface 34b faces the nozzle ring main surface 32a of the nozzle ring 32. A length from the vane main surface 34a to the vane rear surface 34b along the direction of the nozzle axis NX is defined as a nozzle vane width. A distance from the plate rear surface 31b of the CC plate 31 to the nozzle ring main surface 32a is defined as a connecting flow path width. The connecting flow path width is slightly larger than the nozzle vane width. Accordingly, a small first gap C1 exists between the vane main surface 34a and the plate rear surface 31b. Additionally, a small second gap C2 exists between the vane rear surface 34b and the nozzle ring main surface 32*a*. The nozzle vane 34 is capable of moving relative to the CC plate 31 in the direction of the axis of rotation AX by the length of the first gap C1. The nozzle vane 34 is capable of moving relative to the nozzle ring 32 in the direction of the axis of rotation AX by the length of the second gap C2.

The nozzle shaft 37 is attached to the vane rear surface 34*b*. More specifically, the nozzle shaft 37 includes a nozzle shaft base end 37*f* and a nozzle shaft distal end 37*e*. The nozzle shaft base end 37*f* is fixed to the vane rear surface 34*b*. The nozzle shaft 37 passes through the nozzle shaft hole 32*s* of the nozzle ring 32. The nozzle shaft distal end 37*e* is disposed in a position protruding from the body rear surface 32*b*1 of the nozzle ring 32. The nozzle shaft 37 includes a nozzle shaft outer circumferential surface 37*s*. The nozzle shaft outer circumferential surface 37*s* faces an inner circumferential surface 32*s*1 of the nozzle shaft hole 32*s*. A small third gap C3 that allows the nozzle shaft 37 to rotate exists between the inner circumferential surface 32*s*1 and the nozzle shaft outer circumferential surface 37*s*. The nozzle link plate 36 is fixed to the nozzle shaft distal end 37*e*.

The nozzle link plate 36 is a rod-like member. The nozzle link plate 36 includes a link plate main surface 36*a* and a link plate rear surface 36*b*. The nozzle link plate 36 is disposed on the nozzle ring rear surface 32*b*. More specifically, the nozzle link plate 36 includes a portion disposed on the body rear surface 32*b*1 and a portion disposed on the flange rear surface 32*b*2. The link plate main surface 36*a* faces the flange rear surface 32*b*2 of the nozzle ring 32, the drive ring rear surface 35*b*, and the body rear surface 32*b*1 of the nozzle ring 32. The link plate rear surface 36*b* faces a bearing housing main surface 3*a* of the bearing housing 3. The link plate rear surface 36*b* also faces a disc spring 39 described further below.

The nozzle link plate 36 includes a link plate base end 36*f* which is a first end portion, and the link plate distal end 36*e* which is a second end portion. The link plate base end 36*f* is disposed on the body rear surface 32*b*1. The link plate base end 36*f* is provided with a link plate hole 36*s*. The nozzle shaft distal end 37*e* of the nozzle shaft 37 is inserted into the link plate hole 36*s*. The nozzle shaft distal end 37*e* is fixed to the nozzle link plate 36 by riveting. The link plate distal end 36*e* is disposed on the flange rear surface 32*b*2. The link plate distal end 36*e* is fit into the joint 35J (see FIG. 2). More specifically, the link plate distal end 36*e* is disposed between a pair of the raised portions 35J1. The link plate distal end 36*e* is not fixed to the pair of the raised portions 35J1. The nozzle link plate 36 is not fixed to the drive ring 35.

As described above, the nozzle shaft 37 is fixed to the nozzle vane 34. The nozzle link plate 36 is fixed to the nozzle shaft 37. The nozzle vane 34, the nozzle shaft 37, and the nozzle link plate 36 can be considered as the nozzle vane unit 300 which is one component.

The nozzle link plate 36 swings about the nozzle axis NX according to the rotational position of the drive ring 35 relative to the nozzle ring 32. The nozzle shaft 37 rotates about the nozzle axis NX according to the swing of the nozzle link plate 36. The nozzle vane 34 fixed to the nozzle shaft 37 swings about the nozzle axis NX according to the swing of the nozzle link plate 36.

However, the nozzle vane unit 300 may move in a manner different from the above. Small gaps exist between the nozzle vane unit 300 and other components adjacent to the nozzle vane unit 300. The nozzle vane unit 300 is permitted to move relatively by the gaps between the nozzle vane unit 300 and the other adjacent components. The nozzle vane unit 300 may be subjected not only to a force from the drive ring 35, but also to an unintended external force. For example, the nozzle vane unit 300 is subjected to an external force caused by exhaust gas pulses via the nozzle vane 34. Additionally, the variable geometry mechanism 30 including the nozzle vane units 300 may experience random vibrations or shock from other devices such as the internal combustion engine. The random vibrations or shock that act on the other adjacent components turn into an unintended external force. The gaps between the components and the action of the unintended external force may cause unintended movement of the nozzle vane unit 300.

The unintended movement is exemplified by whirling of the nozzle vane unit 300. The unintended movement is not limited to whirling. Whirling of the nozzle vane unit 300 refers to the movement of the nozzle shaft 37 as if the nozzle shaft 37 is shaking its head. Whirling, for example, causes a phenomenon in which the link plate distal end 36*e* of the nozzle link plate 36 irregularly and intermittently impacts the joint 35J of the drive ring 35.

Whirling is caused by the existence of the three gaps. Firstly, the first gap C1 between the vane main surface 34*a* of the nozzle vane 34 and the plate rear surface 31*b* of the CC plate 31. Secondly, the second gap C2 between the vane rear surface 34*b* of the nozzle vane 34 and the nozzle ring main surface 32*a*. Thirdly, the third gap C3 between the nozzle shaft outer circumferential surface 37*s* and the inner circumferential surface 32*s*1 of the nozzle shaft hole 32*s*.

The unintended movement has been described as being caused by the existence of the gaps and the action of the external force. Whirling occurs when all of the first gap C1, the second gap C2, and third gap C3 described above exist. The example turbine 10 thus includes a mechanism to eliminate at least one of the first gap C1, the second gap C2, and the third gap C3. The example turbine 10 suppresses the occurrence of unintended whirling by eliminating the first gap C1. The turbine 10 includes the disc spring 39, which is a biasing member, as a component to eliminate the first gap C1.

"Eliminating the gap" does not require the entire vane main surface 34*a* to be in contact with the plate rear surface 31*b*. Whirling occurs when the entire vane main surface 34*a* is separated from the plate rear surface 31*b*. As long as a part of the vane main surface 34*a* is in contact with the plate rear surface 31*b*, the movement of the nozzle vane 34 is restricted and whirling does not occur. The state in which a part of the vane main surface 34*a* is in contact with the plate rear surface 31*b* is also considered a state in which the gap is eliminated.

A "gap" refers to a state in which the components facing each other are not in contact with each other. For example, "the first gap C1 exists" refers to a state in which the vane main surface 34*a* is not in contact with the plate rear surface 31*b*. Accordingly, the state in which a part of the vane main surface 34*a* is in contact with the plate rear surface 31*b*, as illustrated in FIG. 3, is not strictly referred to as a state in which the first gap C1 exists. The "first gap C1" is indicated in FIG. 3 for convenience of explanation.

Figure 4:
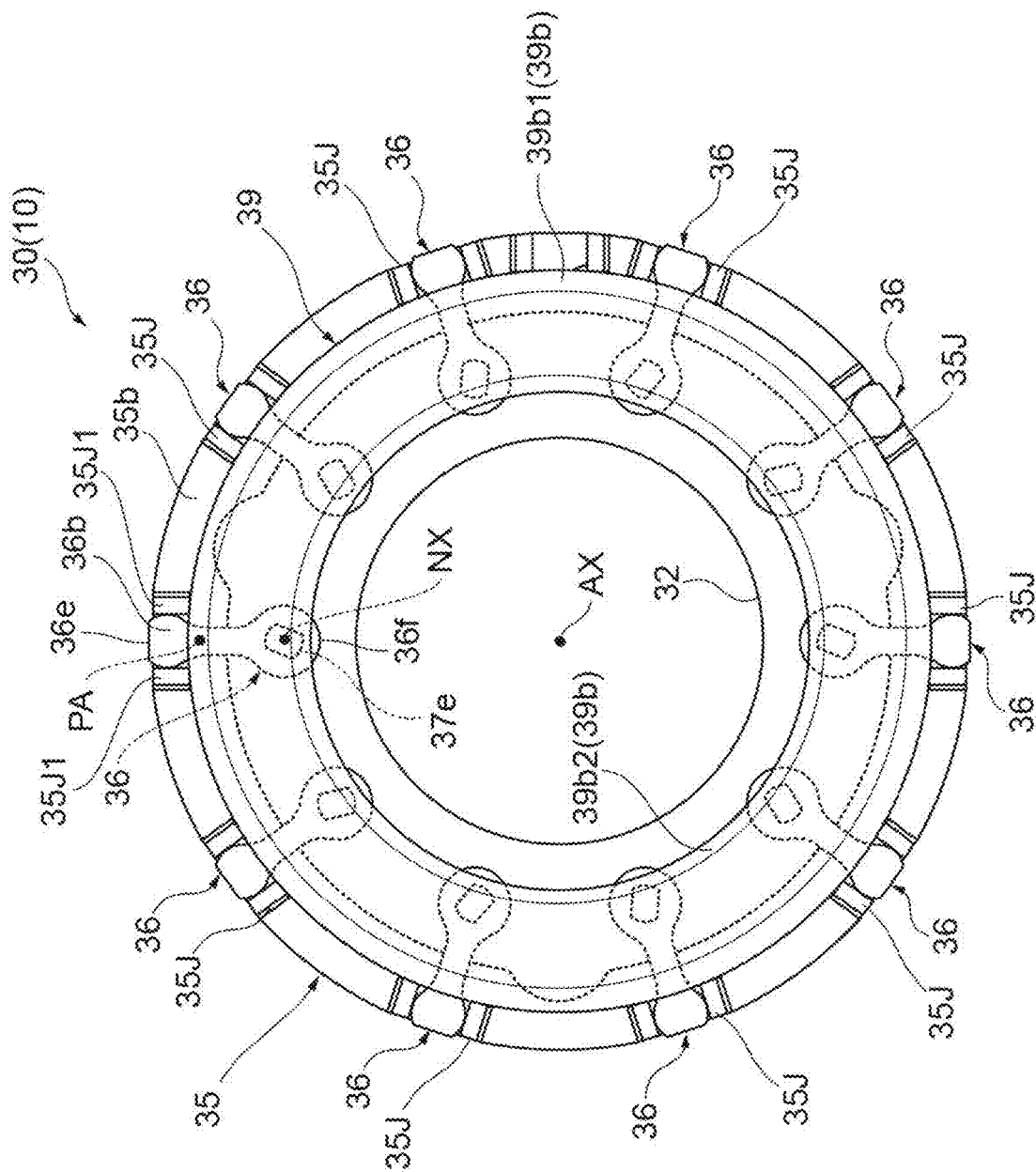
FIG. 4 is a plan view of the variable geometry mechanism and the biasing member of the example turbine.

As illustrated in FIGS. 3 and 4, the disc spring 39 is disposed between the bearing housing 3 and the variable geometry mechanism 30. The disc spring 39 is formed ring-like about the axis of rotation AX. The disc spring 39 is shaped so as to be inclined from an outer diameter toward an inner diameter. The outer diameter of the disc spring 39 is smaller than an outer diameter of the drive ring 35. One disc spring 39 is disposed for all the nozzle link plates 36.

The disc spring 39 includes a spring main surface 39a and a spring rear surface 39b. The spring main surface 39a faces the variable geometry mechanism 30. More specifically, the spring main surface 39a faces the drive ring 35, the nozzle link plates 36, and the nozzle ring 32. The disc spring 39 is disc-shaped. Accordingly, the disc spring 39 faces all the nozzle vane units 300 of the variable geometry mechanism 30. One disc spring 39 presses the plurality of the nozzle vane units 300. Additionally, the spring main surface 39a faces the drive ring rear surface 35b of the drive ring 35. The spring main surface 39a also faces the link plate rear surfaces 36b of the nozzle link plates 36. The spring main surface 39a also faces the body rear surface 32b1 of the nozzle ring 32. The spring main surface 39a includes a spring main surface outer circumferential portion 39a1 and a spring main surface inner circumferential potion 39a2. The spring main surface outer circumferential portion 39a1 is in contact with the nozzle vane units 300. More specifically, the spring main surface outer circumferential portion 39a1 is in contact with the link plate rear surfaces 36b of the nozzle link plates 36. The spring main surface inner circumferential portion 39a2 is not in contact with the nozzle vane units 300. The spring main surface inner circumferential portion 39a2 is separated from the link plate rear surfaces 36b. For example, the spring main surface inner circumferential portion 39a2 is separated from the nozzle shaft distal ends 37e and faces the nozzle shaft distal ends 37e.

The spring rear surface 39b faces the bearing housing main surface 3a. The spring rear surface 39b includes a spring rear surface outer circumferential portion 39b1 and a spring rear surface inner circumferential portion 39b2. The spring rear surface outer circumferential portion 39b1 is separated from the bearing housing main surface 3a. The spring rear surface inner circumferential portion 39b2 is in contact with the bearing housing main surface 3a.

The disc spring 39 is disposed between the nozzle link plates 36 and the bearing housing 3. A distance from the nozzle link plates 36 to the bearing housing 3 is smaller than an equilibrium length of the disc spring 39. The disc spring 39 is thus compressed in the direction of the axis of rotation AX. The disc spring 39 generates an elastic force as a biasing force by being compressed. The elastic force acts on the nozzle link plates 36, with a portion of the spring main surface outer circumferential portion 39a1 in contact with the link plate rear surfaces 36b being a force point PA.

When a force is applied to the nozzle vane units 300, the nozzle shafts 37 move along an axial direction. The nozzle vanes 34 move along the axial direction along with the movement of the nozzle shafts 37. The nozzle vanes 34 abut against the CC plate 31 which is a portion (or surface portion or contact surface) that faces the nozzle vanes 34. As a result, the first gaps C1 are eliminated.

The magnitude of a force F is such that it does not hinder the movement required of the nozzle vane units 300. A targeted magnitude of the force F is such that the vane main surfaces 34a of the nozzle vanes 34 come into contact with the plate rear surface 31b of the CC plate 31. This is because if the vane main surfaces 34a are pressed against the plate rear surface 31b, a frictional force is created between the vane main surfaces 34a and the plate rear surface 31b. The frictional force created by the contact between the vane main surfaces 34a and the plate rear surface 31b may be permitted if it does not hinder the swinging of the nozzle vanes 34 corresponding to the movement of the drive ring 35. The elastic force may be set to a magnitude such that a pressing force acts on the plate rear surface 31b from the vane main surfaces 34a. The state in which a pressing force acts on the plate rear surface 31b from the vane main surfaces 34a enables counteracting the irregular external force acting on the nozzle vanes 34 caused by exhaust gas pulses. The elastic force may be set based on the magnitude of the expected external force.

Other than the application of the elastic force by the disc spring 39, the positions of the components that form the variable geometry mechanism 30 are also involved in the elimination of the first gaps C1 above. To eliminate the first gaps C1 by applying the force F to the nozzle link plates 36, it is required that the vane main surfaces 34a can be moved until they are in contact with the plate rear surface 31b. This can be achieved by a relationship being satisfied in which fourth gaps C4 between the link plate main surfaces 36a and the body rear surface 32b1 are greater than the first gaps C1 between the vane main surfaces 34a and the plate rear surface 31b. For example, the fourth gaps C4 still exist between the link plate main surfaces 36a and the body rear surface 32b1 in the state in which the vane main surfaces 34a are in contact with the plate rear surface 31b.

The position of the force point PA will be described. The link plate rear surface 36b of each of the nozzle link plates 36 has a first region S1 and a second region S2. The first region S1 overlaps with a projection region SB of the nozzle vane 34 viewed in the axial direction along the nozzle axis NX. The first region S1 includes the link plate base end 36f. The first region S1 is a region close to the nozzle shaft distal end 37e. The second region S2 is a portion of the link plate rear surface 36b excluding the first region S1. The second region S2 does not overlap with the projection region SB of the nozzle vane 34 viewed in the axial direction along the nozzle axis NX. The second region S2 is a region remote from the link plate base end 36f of the nozzle link plate 36. The second region S2 includes a region up to the link plate distal end 36e of the nozzle link plate 36. The second region S2 is a region remote from the nozzle shaft 37. An area of the second region S2 may be greater than an area of the first region S1.

The force point PA of the disc spring 39 in some examples is positioned in the second region S2 above. The force point PA is positioned in the region remote from the link plate base end 36f of the nozzle link plate 36.

According to the example turbine 10 above, only a rotation about the nozzle axis NX is possible as the movement of the nozzle vane unit 300 relative to the nozzle ring 32. Thus, other movement of the nozzle vane units 300 such as unintended whirling is suppressed. Accordingly, irregular movement of the nozzle vane units 300 relative to the nozzle ring 32 does not occur even if the nozzle vanes 34 receive an irregular external force. The state of the component group that forms the variable geometry mechanism 30 can be maintained favorably, so that the state in which the variable geometry mechanism 30 is capable of exhibiting a desired performance can be maintained. The reliability of the turbine 10 including the variable geometry mechanism 30 can thus be improved.

By having the CC plate 31, the distance from the CC plate 31 to the nozzle ring 32 can be precisely set. The gaps formed between the nozzle vanes 34 and a disc member (CC plate 31 or nozzle ring 32) can also be precisely set. A force that is capable of suppressing the occurrence of irregular movement of the nozzle vanes 34 can also be set easily without inhibiting the rotational movement of the nozzle vanes 34 around the nozzle shafts 37.

Furthermore, the distance from the nozzle ring 32 to the nozzle link plates 36 along the direction of the axis of rotation AX (fourth gap C4) is greater than the distance from the nozzle vanes 34 to the CC plate 31 facing the nozzle vanes 34 along the direction of the axis of rotation AX (first gap C1). The nozzle vanes 34 abut against the CC plate 31 before the nozzle link plates 36 abut against the nozzle ring 32 by the force F. The nozzle vanes 34 can be reliably brought into contact with the CC plate 31 which is the portion that faces the nozzle vanes 34.

The force F is applied to each nozzle shaft 37 at a position offset from the nozzle axis NX. According to such configuration, the force F by the disc spring 39 is applied to the region remote from the nozzle shaft 37 (second region S2). A distance from the position on the nozzle link plate 36 to be the force point PA on which the force F acts to the portion at which the nozzle link plate 36 is connected to the nozzle shaft 37 is increased. A moment which tries to tilt the nozzle shaft 37 of the nozzle vane unit 300 is generated. Movement such as unintended whirling is further suppressed, since a frictional force is created due to contact with the inner circumferential surface 32s1 of the nozzle shaft hole 32s.

The elimination of the first gaps C1 between the nozzle vanes 34 and the CC plate 31 also produces effects other than the suppression of whirling.

As illustrated in FIG. 1, the exhaust gas discharged from the variable geometry mechanism 30 is received by a blade portion 12s of the turbine wheel 12. The state of the exhaust gas sent from the variable geometry mechanism 30 to the turbine wheel 12 is intended to be uniform regardless of the location. However, due to the configuration of the connecting flow path S in the variable geometry mechanism 30, the state of the exhaust gas sent to the turbine wheel 12 may vary depending on the location. For example, the first gaps C1 between the nozzle vanes 34 and the CC plate 31 and the second gaps C2 between the nozzle vanes 34 and the nozzle ring 32 affect the state of the exhaust gas. By eliminating the first gaps C1 and the second gaps C2, the state of the exhaust gas may be brought closer to a targeted state.

In some examples, the first gaps C1 are eliminated by bringing the nozzle vanes 34 into contact with the CC plate 31. The second gaps C2 between the nozzle vanes 34 and the nozzle ring 32, however, still remain.

The flow path of the exhaust gas forms a space between the turbine wheel 12 and the turbine housing 11. A small gap C5 is formed along a portion at which the turbine wheel 12 faces the turbine housing 11. The gap C5 tends to affect the state of the flow. The portion at which the turbine wheel 12 and the turbine housing 11 face each other is positioned downstream of the portion at which the nozzle vanes 34 and the CC plate 31 face each other. The first gaps C1 are eliminated in the portion at which the nozzle vanes 34 and the CC plate 31 face each other. Thus, the turbulence of the exhaust gas tends to be suppressed. The exhaust gas in which turbulence is suppressed is supplied to the portion at which the nozzle vanes 34 and the CC plate 31 face each other. As a result, exhaust gas that is close to a targeted state is provided to the turbine wheel 12. Consequently, the energy of the exhaust gas can be efficiently recovered by the turbine wheel 12, which contributes to the improvement of the performance of the turbocharger 1.

Figure 5:
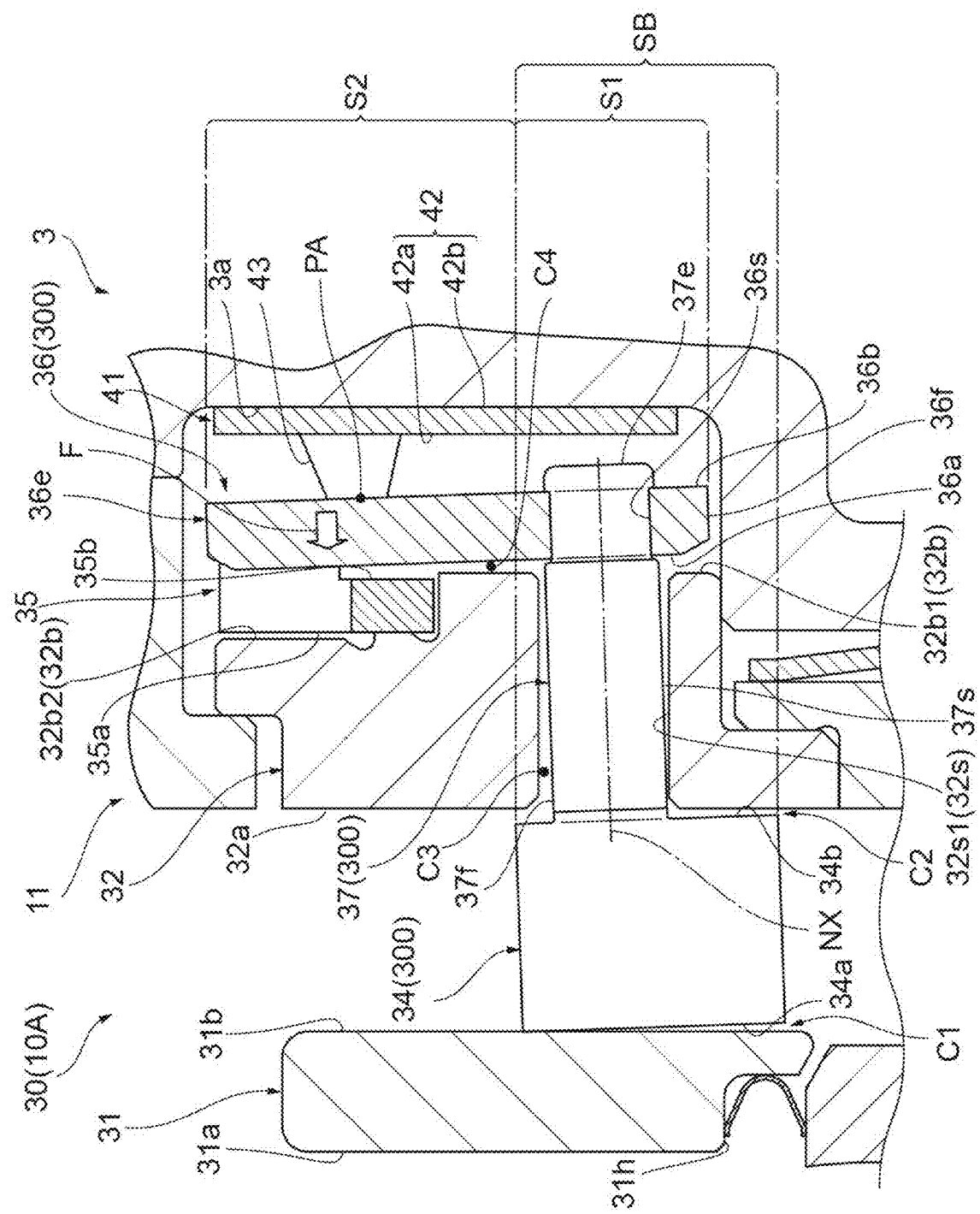
FIG. 5 is an enlarged cross-sectional view of main parts of a variable geometry mechanism and a biasing member of another example turbine.
Figure 6:
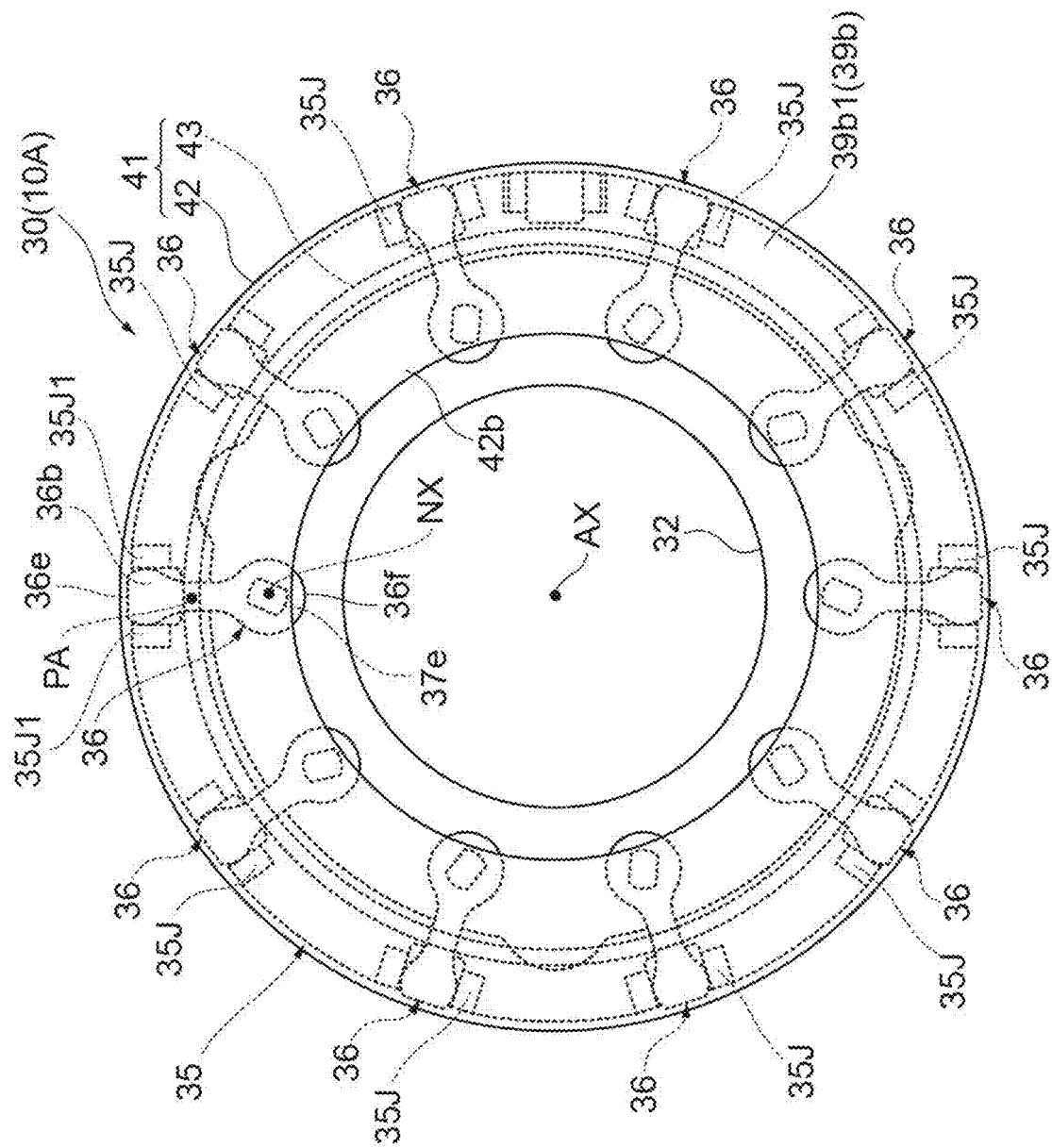
FIG. 6 is a plan view of the variable geometry mechanism and the biasing member of the example turbine of FIG. 5.

FIG. 5 is a cross-sectional view of a main part of an example turbine 10A. FIG. 6 is a plan view of a biasing member of the turbine 10A. The turbine 10A is different from the turbine 10 in that it has a heat shield plate 41 instead of the disc spring 39.

The heat shield plate 41 blocks the heat on the turbine housing 11 side. The heat shield plate 41 also functions as the disc spring 39. The heat shield plate 41 presses the nozzle vane units 300. The heat shield plate 41 includes a disc portion 42 and a spring portion 43.

The disc portion 42 has a disc-like shape about the axis of rotation AX. The disc portion 42 is disposed on a side of the nozzle ring 32 closer to the bearing housing 3. The disc portion 42 is separated from the nozzle link plates 36 in the axial direction along the axis of rotation AX. The disc portion 42 includes a disc main surface 42a and a disc rear surface 42b. The disc main surface 42a faces the nozzle link plates 36. The disc rear surface 42b may be in contact with the bearing housing 3. The disc portion 42 suppresses the rise in temperature of the bearing housing 3.

The spring portion 43 protrudes from the disc main surface 42a. The disc portion 42 and the spring portion 43 are integrally formed. The spring portion 43 is formed ring-like about the axis of rotation AX. A cross-sectional shape of the spring portion 43 is not limited so long as it is a shape that can generate a restoring force by being compressed. Similarly to the example disc spring 39 of FIGS. 2 and 3, one spring portion 43 is in contact with the plurality of the nozzle link plates 36. The spring portion 43 enables the position of the force point PA to be arbitrarily set by a diameter of the spring portion 43 being set as appropriate. In the example illustrated in FIG. 5, the position at which the spring portion 43 is in contact with the nozzle link plates 36 (position of the force point PA) is in the second region S2. For example, if the diameter of the spring portion 43 is set smaller than that illustrated in FIG. 5, the position of the force point PA can be set in the first region S1.

Similarly to the example disc spring 39, the heat shield plate 41 is in contact with the nozzle link plates 36 and applies a force to the nozzle link plates 36. The turbine 10A produces effects similar to those of the turbine 10.

Figure 7:
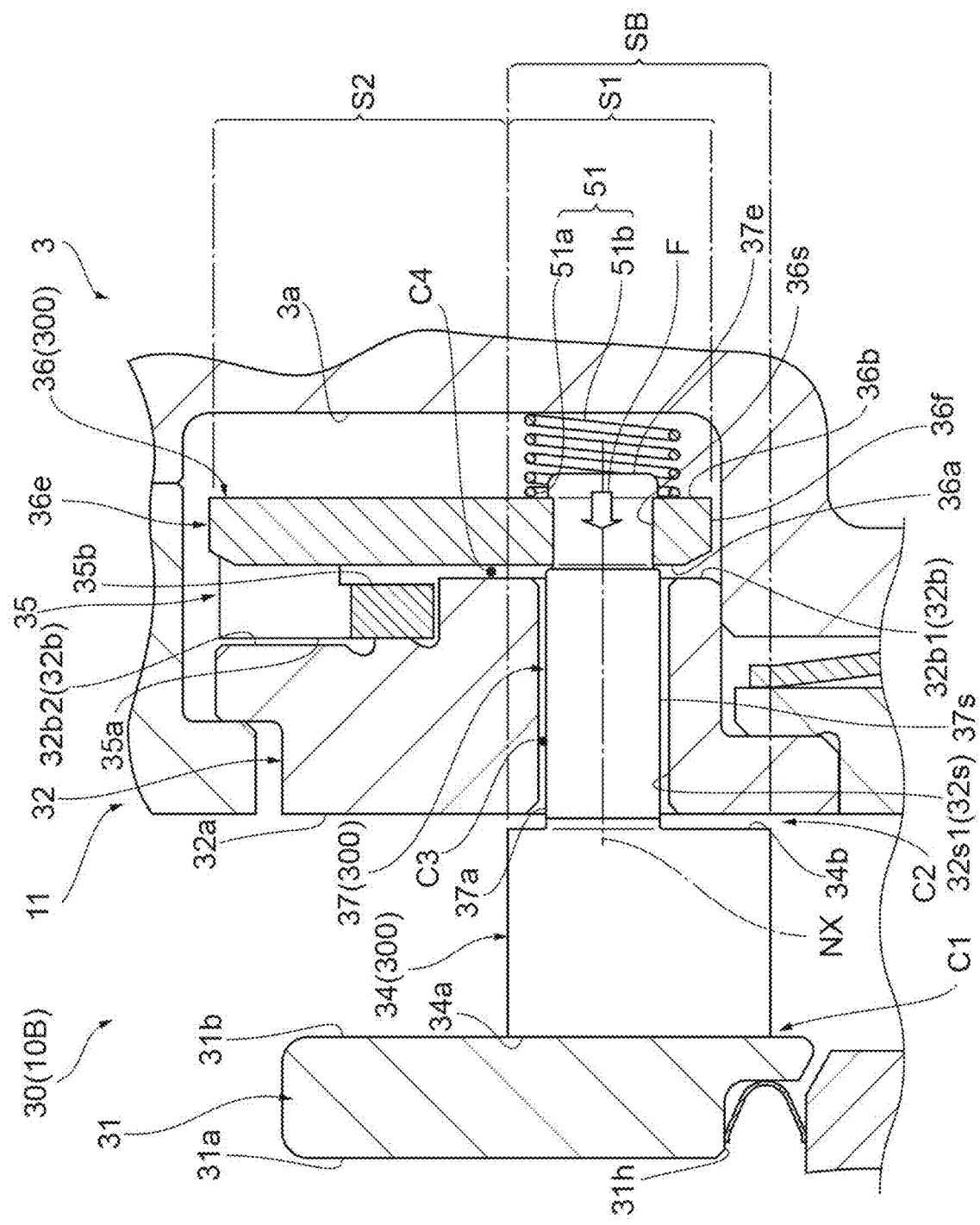
FIG. 7 is an enlarged cross-sectional view of main parts of a variable geometry mechanism and a biasing member of another example turbine.
Figure 8:
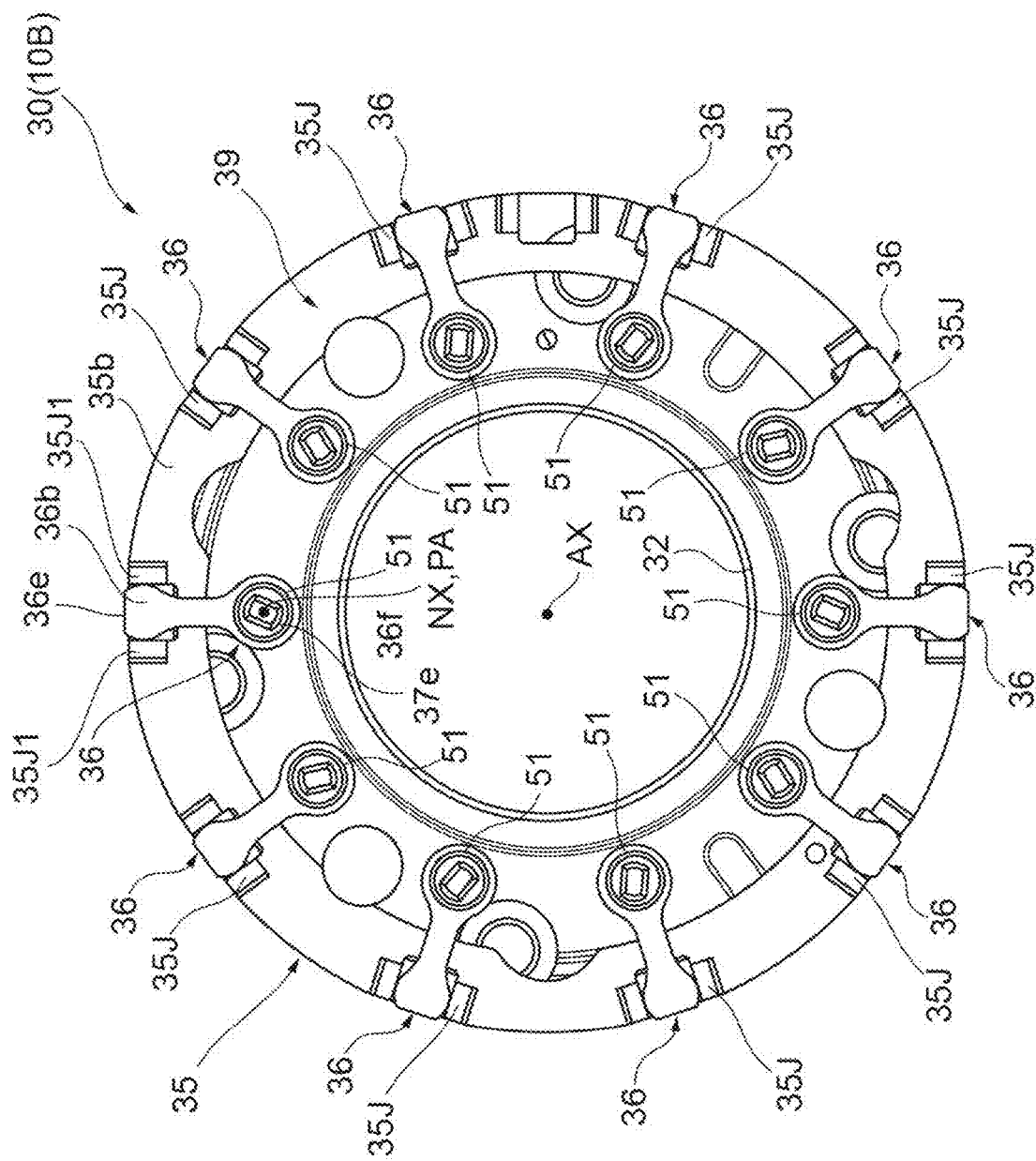
FIG. 8 is a plan view of the variable geometry mechanism and the biasing member of the example turbine of FIG. 7.

FIG. 7 is a cross-sectional view illustrating a main part of an example turbine 10B. FIG. 8 is a plan view illustrating a biasing member of the turbine 10B. In some examples, the disc spring 39 is exemplified as the biasing member. In some examples, a configuration in which one disc spring 39 presses the plurality of the nozzle vane units 300 is exemplified. However, the biasing member is not limited to the disc spring 39. The biasing member is also not limited to a configuration in which one biasing member presses the plurality of the nozzle vane units 300. In some examples, a coil spring 51 is exemplified as the biasing member. Additionally, in some examples, a configuration in which one coil spring 51 (biasing member) presses one nozzle vane unit 300 is exemplified.

The coil spring 51 is disposed between the nozzle link plate 36 and the bearing housing 3. Additionally, the coil spring 51 is disposed coaxially with the nozzle shaft 37. One coil spring 51 is disposed for each nozzle link plate 36 (see FIG. 8).

More specifically, a spring distal end 51a of the coil spring 51 is in contact with the link plate rear surface 36b of the nozzle link plate 36. A distance from the link plate rear surface 36b to the bearing housing main surface 3a can be easily set precisely, since the link plate rear surface 36b is a flat surface. The distance from the link plate rear surface 36b to the bearing housing main surface 3a affects the magnitude of the force F generated by the coil spring 51. If the distance from the link plate rear surface 36b to the bearing housing main surface 3a can be set precisely, the magnitude of the force F generated by the coil spring 51 can also be set precisely. A spring rear end 51b of the coil spring 51 is in contact with the bearing housing main surface 3a.

Additionally, the spring distal end 51a is disposed to surround the nozzle shaft distal end 37e. The nozzle shaft distal end 37e is disposed inside the coil spring 51. It can be said that the spring distal end 51a is in contact with the first region S1 of the nozzle link plate 36. It can be said that a line of action of the force F generated by the coil spring 51 matches the nozzle axis NX. When the line of action of the force F does not match the nozzle axis NX, a moment corresponding to a distance from the line of action to the nozzle axis NX is generated. The moment corresponding to the distance from the line of action to the nozzle axis NX tilts the nozzle shaft 37 (see FIG. 3), so that an action to push the nozzle shaft outer circumferential surface 37s against the inner circumferential surface 32s1 of the nozzle shaft hole 32s is generated. In contrast, when the line of action of the force F matches the nozzle axis NX, no moment to tilt the nozzle shaft 37 is generated. Accordingly, only a force that moves the nozzle vane unit 300 in the direction of the nozzle axis NX is exerted.

In the turbine 10B, the force by the coil spring 51 is applied to a region close to the nozzle shaft 37. Accordingly, the tilt of the nozzle shaft 37 relative to the nozzle axis NX due to the force F is suppressed. Contact of the nozzle shaft 37 with the inner circumferential surface 32s1 of the nozzle shaft hole 32s can be suppressed.

In some examples, a configuration is employed to eliminate the first gaps C1 to suppress whirling. The suppression of whirling can also be achieved by eliminating the third gaps C3 between the nozzle shaft outer circumferential surfaces 37s and the inner circumferential surfaces 32s1 of the nozzle shaft holes 32s. In some examples, a biasing member that eliminates the third gaps C3 is exemplified.

Figure 9:
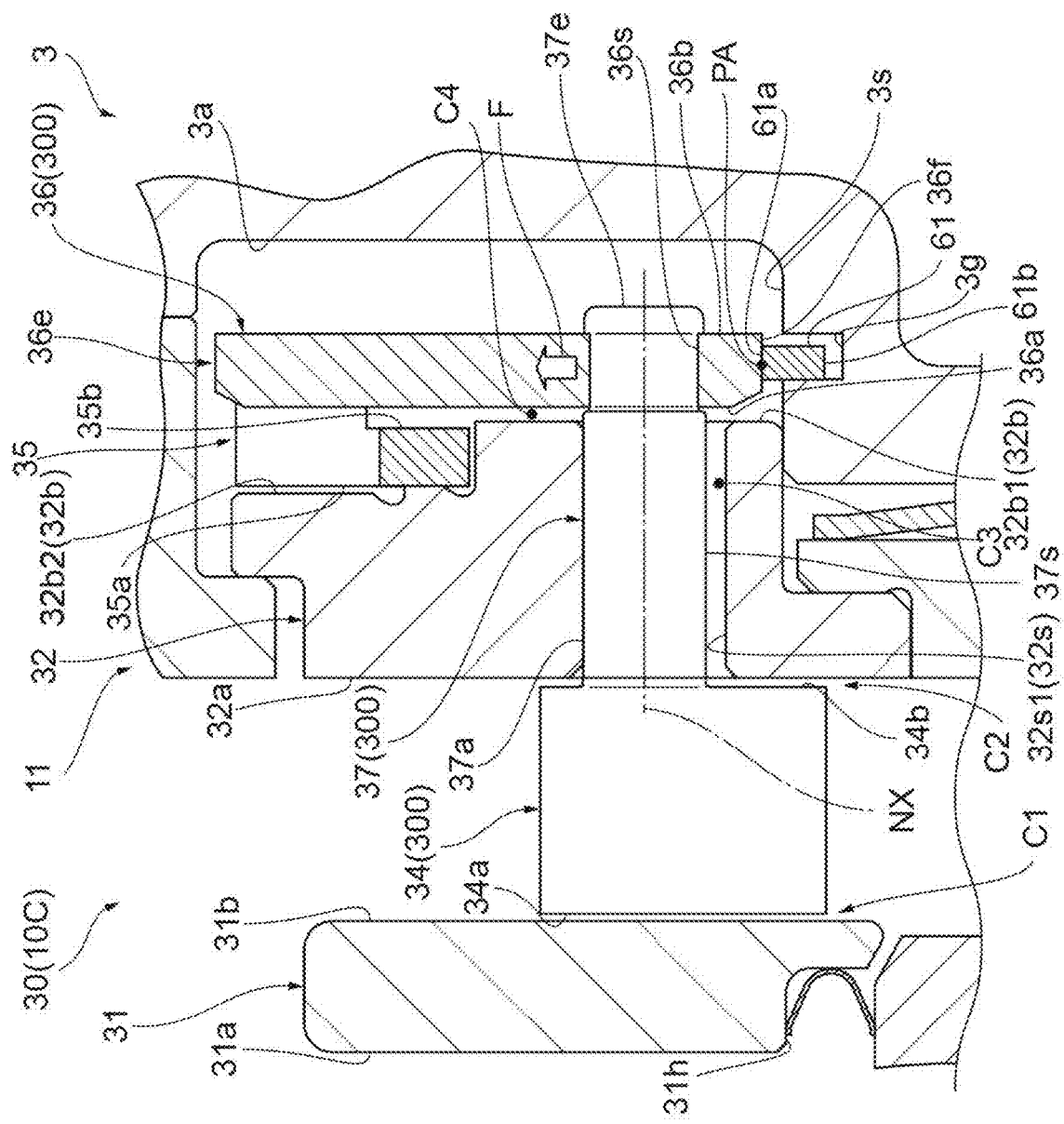
FIG. 9 is an enlarged cross-sectional view of main parts of a variable geometry mechanism and a biasing member of another example turbine.
Figure 10:
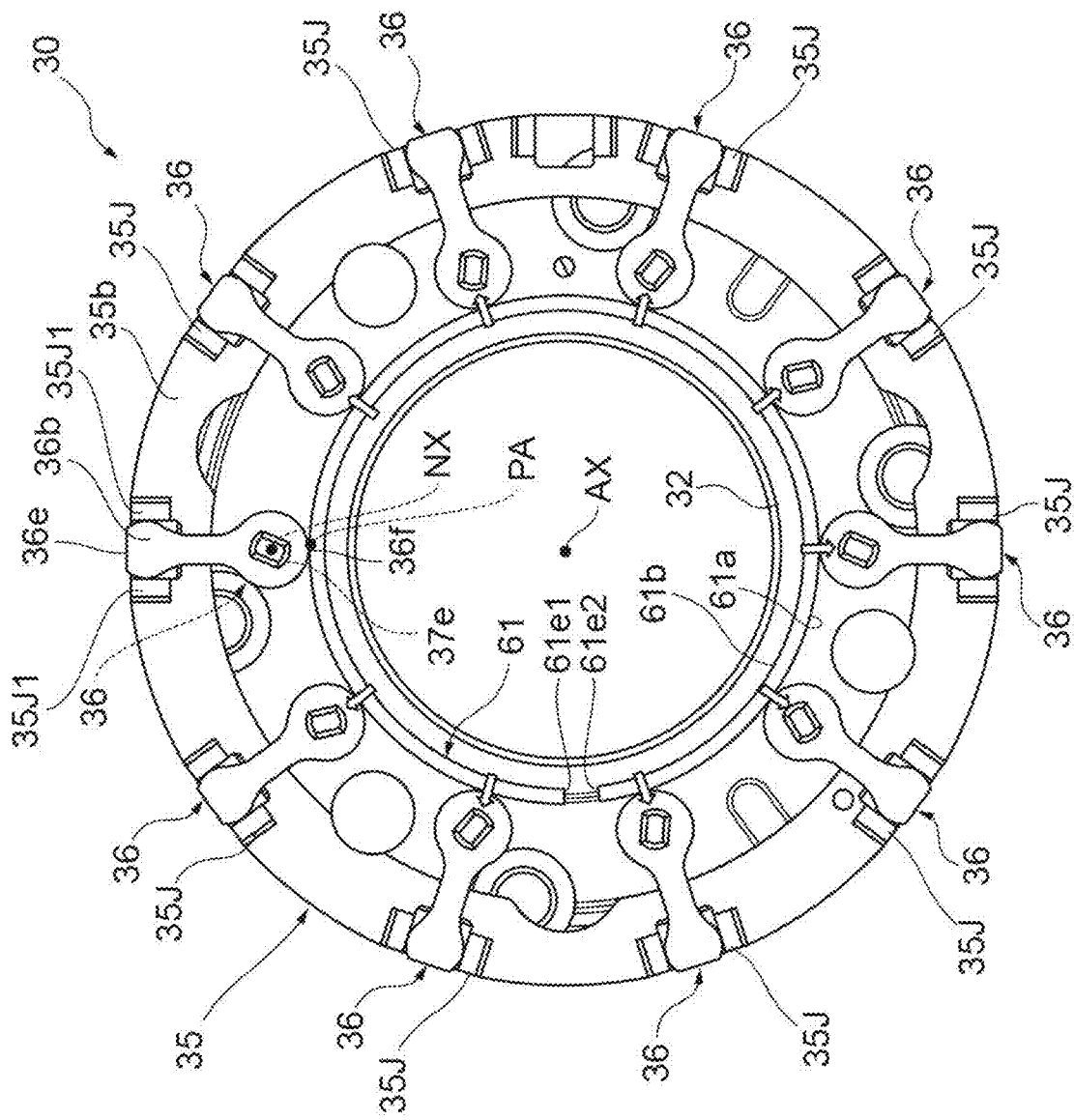
FIG. 10 is a plan view of the variable geometry mechanism and the biasing member of the example turbine of FIG. 9.

FIG. 9 is a cross-sectional view illustrating a main part of an example turbine 10C. FIG. 10 is a plan view illustrating a biasing member of the turbine 10C. The turbine 10C is different from the turbine 10 in that it has a ring spring 61 instead of the disc spring 39.

The ring spring 61 is a spring member. For example, a piston ring or a gasket may be used as the biasing member. The ring spring 61 is annularly-shaped about the axis of rotation AX, with a portion cut out along the circumference. Thus, the ring spring 61 is C-shaped in a plan view. In the portion of the ring spring 61 that is cut out, a pair of spring ends 61e1, 61e2 are formed separated from each other. When deformed so as to bring a first spring end 61e1 closer to a second spring end 61e2, a diameter of the ring spring 61 is reduced. A restoring force to return to its original diameter is generated in the ring spring 61. A direction of the restoring force can be considered to be the same as a direction of the diameter of the ring spring 61.

The ring spring 61 includes a spring outer circumferential surface 61a and a spring inner circumferential surface 61b. The spring outer circumferential surface 61a is in contact with the link plate base ends 36f of the nozzle link plates 36. More specifically, the spring outer circumferential surface 61a is in contact with base end surfaces of the link plate base ends 36f. Additionally, the ring spring 61 is C-shaped in a plan view. Accordingly, one ring spring 61 presses the plurality of the nozzle link plates 36 outward in the radial direction. The spring inner circumferential surface 61b is disposed in a spring groove 3g provided in the bearing housing 3. The spring groove 3g is provided in an outer circumferential surface of a fitting part 3s protruding from the bearing housing main surface 3a toward the turbine housing 11. This configuration permits an expanding or contracting deformation of the diameter of the ring spring 61. Furthermore, the movement of the ring spring 61 in the direction of the axis of rotation AX can be limited. Accordingly, the position of the ring spring 61 can be prevented from shifting in the direction of the axis of rotation AX, so that the state in which the nozzle link plates 36 are pressed can be maintained.

The ring spring 61 is in contact with the nozzle link plates 36 and applies a force in the radial direction of the nozzle shafts 37. When a force in the radial direction is applied to the nozzle link plates 36, the nozzle link plates 36 move along the radial direction. When the nozzle link plates 36 move, the nozzle shafts 37 attached to the link plate base ends 36f move along the radial direction. The nozzle shafts 37 then abut against the inner circumferential surfaces 32s1 of the nozzle shaft holes 32s of the nozzle ring 32. The third gaps C3 in the radial direction between the nozzle vanes 34 and the nozzle ring 32 are eliminated.

According to the turbine 10C, only the rotation about the nozzle shaft 37 is possible as the movement of the nozzle vane unit 300 relative to the nozzle ring 32, and other movement such as unintended whirling is suppressed. Accordingly, even if the nozzle vanes 34 receive an irregular force, irregular movement of the nozzle vane units 300 does not occur. The state of the component group that forms the variable geometry mechanism 30 can be maintained favorably, so that the state in which the variable geometry mechanism 30 is capable of exhibiting a desired performance can be maintained. The reliability of the turbine 10C including the variable geometry mechanism 30 can thus be improved.

It is to be understood that not all aspects, advantages and features described herein may necessarily be achieved by, or included in, any one particular example. Indeed, having described and illustrated various examples herein, it should be apparent that other examples may be modified in arrangement and detail.

Figure 11:
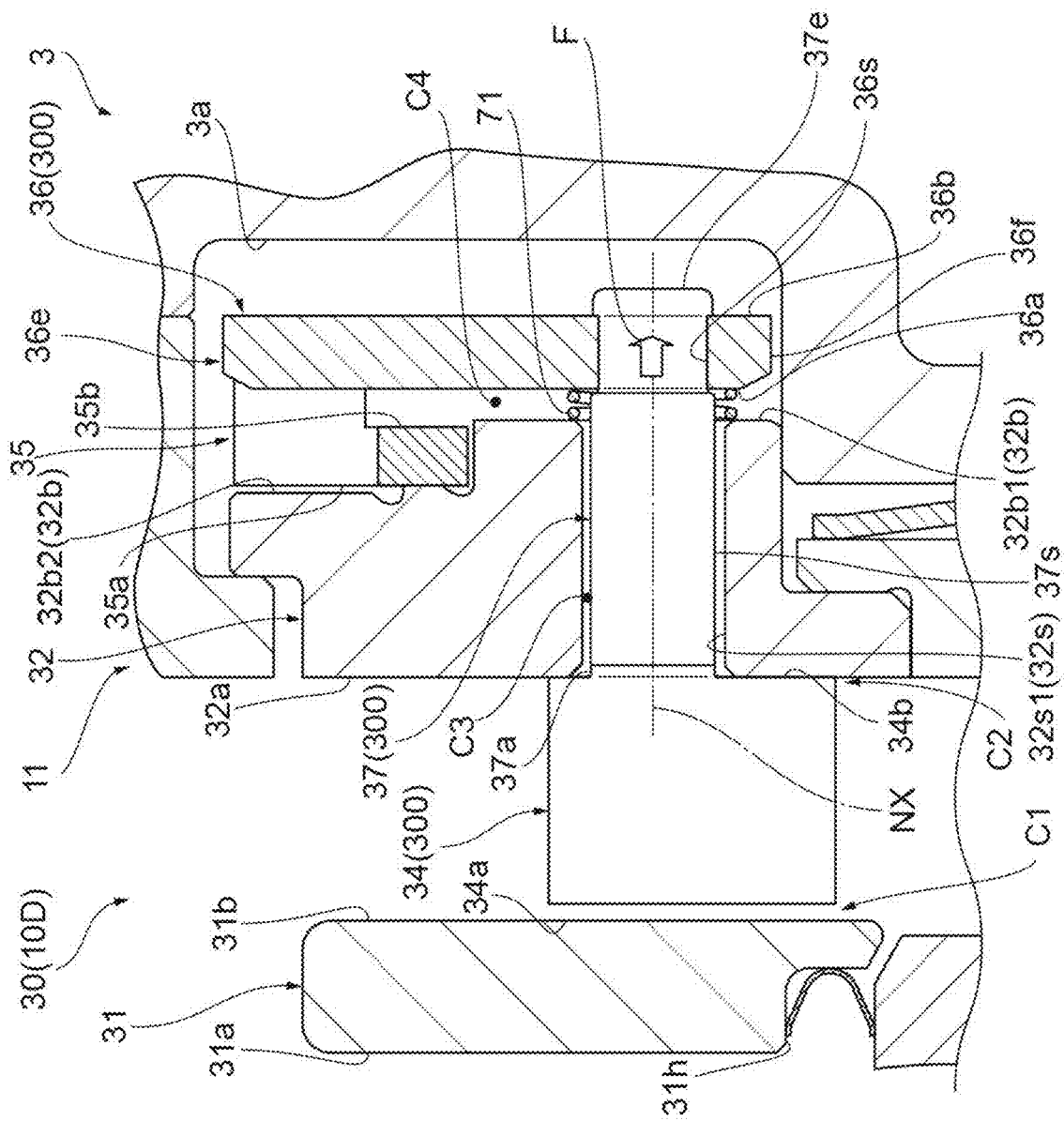
FIG. 11 is an enlarged cross-sectional view of main parts of a variable geometry mechanism and a biasing member of another example turbine.

For example, FIG. 11 is a cross-sectional view illustrating a main part of an example turbine 10D. The turbine 10D is different from the turbine 10B in that it includes springs 71 instead of the coil springs 51.

The spring 71 may, for example, be a coil spring or a disc spring. The spring 71 is disposed between the nozzle ring 32 and the nozzle link plate 36. Specifically, the spring 71 is disposed between the body rear surface 32b1 of the nozzle ring 32 and the link plate main surface 36a of the nozzle link plate 36. Additionally, the spring 71 is disposed substantially coaxially with the nozzle shaft 37. One spring 71 is disposed for each nozzle link plate 36. For example, in a case in which the spring 71 is a coil spring, the nozzle shaft 37 is inserted inside the coil spring.

The spring 71 is in contact with the nozzle link plate 36, and applies the force F in the direction of the nozzle axis NX. The direction of the force F generated by the spring 71 is opposite the direction of the force F generated by an example coil spring 51. When the force F in the axial direction is applied to the nozzle link plate 36, the nozzle link plate 36 moves along the nozzle axis NX. The nozzle link plate 36 is separated from the nozzle ring 32. When the nozzle link plate 36 is separated from the nozzle ring 32, the nozzle shaft 37 attached to the link plate base end 36f of the nozzle link plate 36 moves along the axial direction. The nozzle vane 34 attached to the nozzle shaft base end 37f moves along the nozzle axis NX. The vane rear surface 34b of the nozzle vane 34 abuts against the nozzle ring main surface 32a. The second gap C2 between the nozzle vane 34 and the nozzle ring 32 is eliminated.

Similarly to the turbine 10, the turbine 10D is capable of suppressing movement such as unintended whirling.

Figure 12:
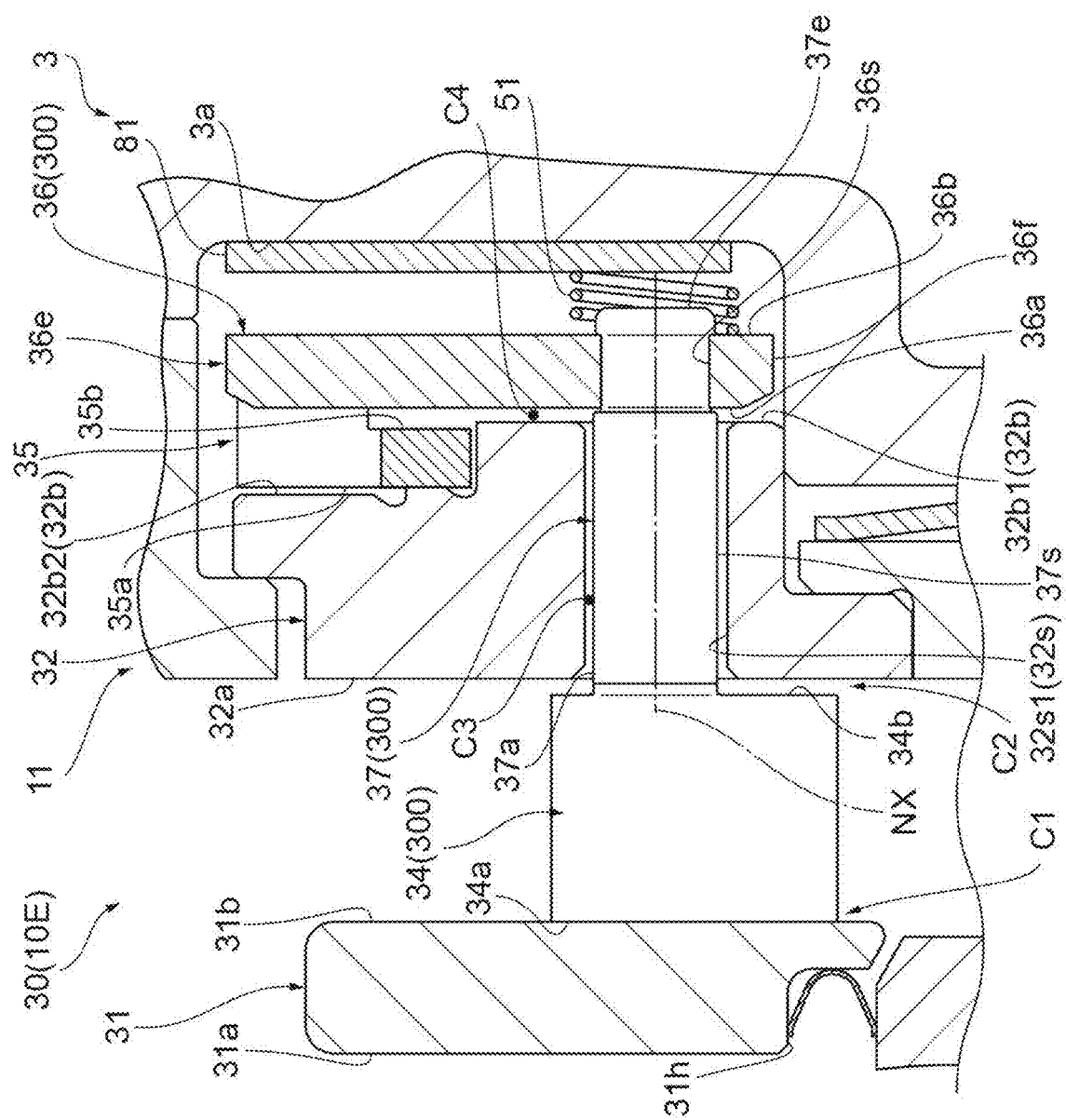
FIG. 12 is an enlarged cross-sectional view of main parts of a variable geometry mechanism and a biasing member of another example turbine.

FIG. 12 is a cross-sectional view illustrating a main part of an example turbine 10E. The turbine 10E is different from the turbine 10B in that it further includes a heat shield plate 81. The coil spring 51 is disposed between the nozzle link plate 36 and the heat shield plate 81. As illustrated in FIG. 12, the coil spring 51 is in contact with the nozzle link plate 36. The other end of the coil spring 51 is in contact with the heat shield plate 81. The coil spring 51 is in contact with a first region of the nozzle link plate 36, and applies the force F in the direction of the nozzle axis NX. The turbine 10E produces effects similar to those of the turbine 10B.

Figure 13:
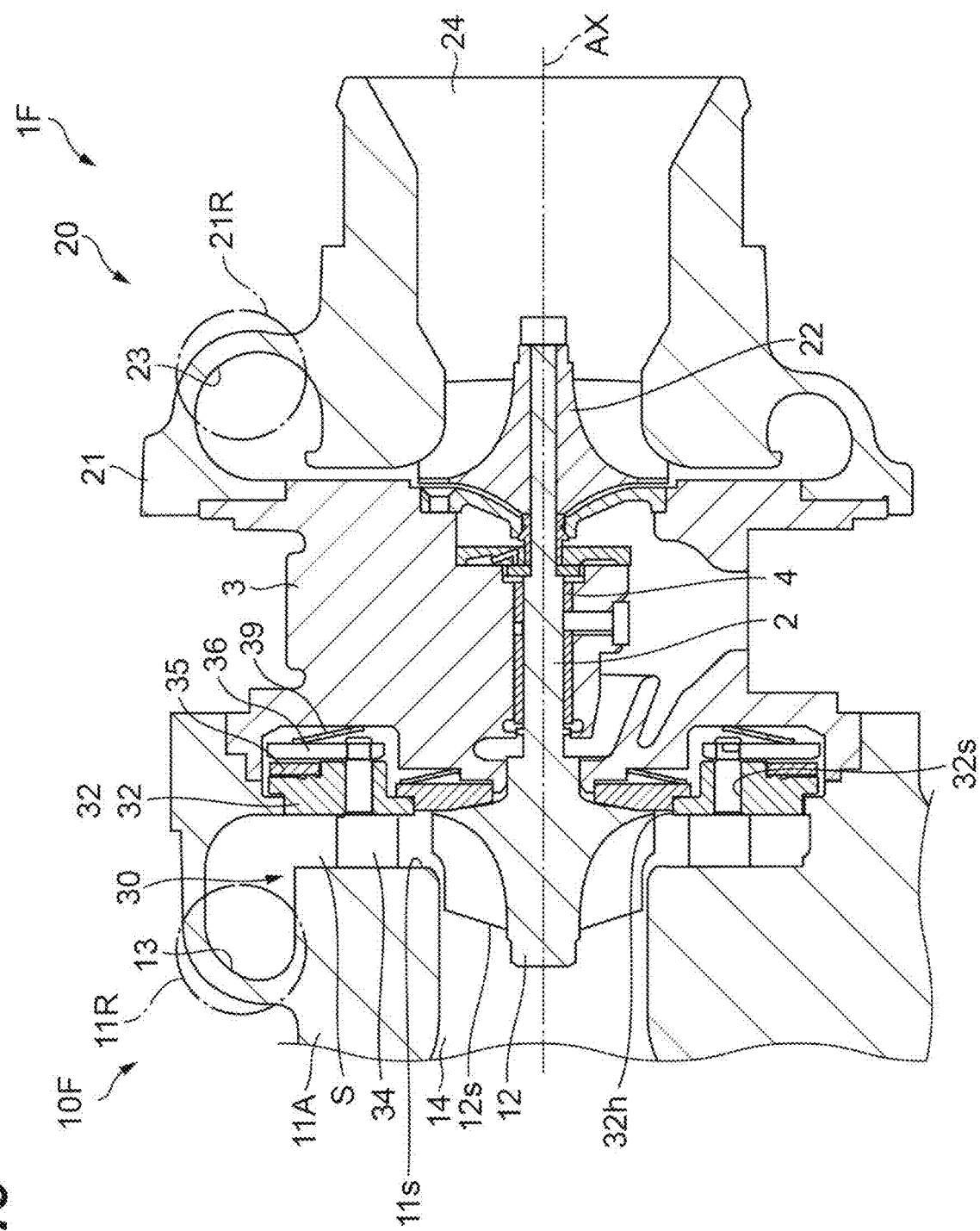
FIG. 13 is a cross-sectional view of another example turbocharger including another example turbine.

FIG. 13 is a cross-sectional view of a turbocharger 1F including an example turbine 10F. In some examples, it is described that the portion facing the nozzle vane 34 is the CC plate 31. As illustrated in FIG. 13, the portion facing the nozzle vane 34 may be a turbine housing 11A. The turbine housing 11A includes a flow path surface 11s which faces an end surface of the nozzle vane 34 opposite to an end surface on which the nozzle shaft 37 is provided. The nozzle vane 34 may abut against the flow path surface 11s of the turbine housing 11A. Such configuration eliminates the need for the CC plate 31 which is a separate component with which the nozzle vane 34 comes into contact. Accordingly, the turbine 10 can have a simple configuration.

Figure 14:
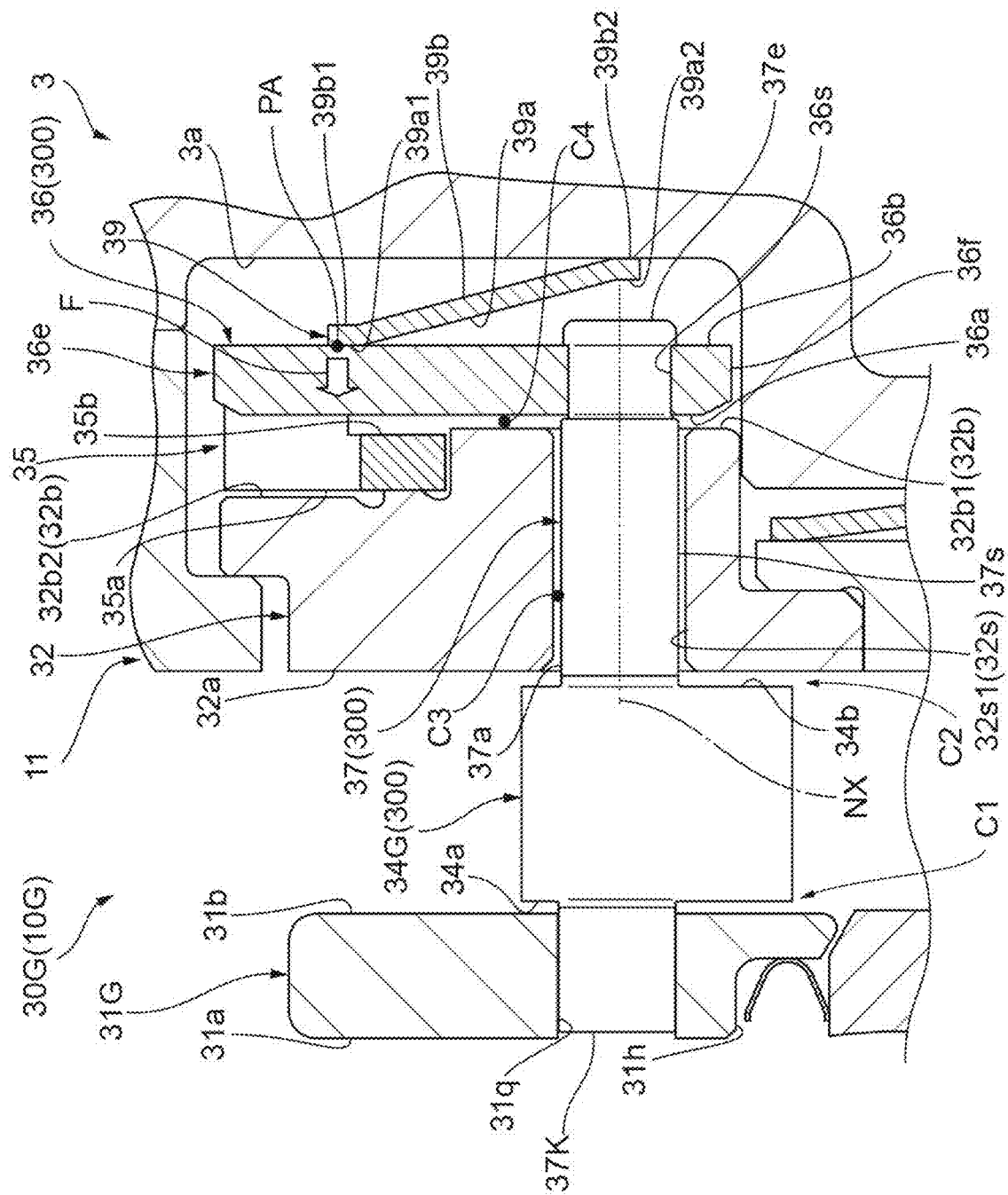
FIG. 14 is an enlarged cross-sectional view of main parts of a variable geometry mechanism and a biasing member of another example turbine.

FIG. 14 is a cross-sectional view illustrating a main part of a variable geometry mechanism (or variable geometry device) 30G of an example turbine 10G. In some examples, a configuration in which the nozzle vane 34 has the nozzle shaft 37 provided on the vane rear surface 34b is exemplified. The support configuration of some examples is a so-called overhang type. As illustrated in FIG. 14, the support structure of a nozzle vane 34G may be a so-called straddle mounted type. The nozzle vane 34G may also have a nozzle shaft 37K on the vane main surface 34a opposite the vane rear surface 34b on which the nozzle shaft 37 is provided. The nozzle shaft 37K is formed coaxially with the nozzle shaft 37. The nozzle shaft 37K is inserted into a hole 31q formed in a CC plate 31G. The nozzle vane 34 is supported on both the CC plate 31G side and the nozzle ring 32 side by the nozzle shafts 37, 37K.

The invention claimed is:

1. A turbine comprising:
    a turbine wheel;
    a housing including a flow path to direct therethrough a gas received from an inlet port;
    a variable geometry device disposed inside the housing, and configured to receive the gas from the flow path and guide the gas to the turbine wheel, the variable geometry device including a disc-shaped nozzle ring having a main surface and a rear surface opposite the main surface, and nozzle vane members including:
        nozzle vanes disposed adjacent to the main surface of the nozzle ring;
        nozzle shafts extending respectively from the nozzle vanes and through the nozzle ring; and
        nozzle link plates disposed adjacent to the rear surface of the nozzle ring and connected to distal ends of the nozzle shafts, respectively; and
    one or more biasing members in contact with the nozzle link plates, to primarily apply a biasing force in an axial direction of the nozzle shafts, wherein the biasing force urges the nozzle link plates away from the nozzle ring.

2. The turbine according to claim 1,
    wherein a connecting path extends between the flow path and the turbine wheel, the main surface of the nozzle ring forming a first surface of the connecting path,
    wherein the nozzle vanes are located in the connecting path, the nozzle vanes having rear surfaces that face the first surface of the connecting path, and free end surfaces located opposite the rear surfaces, that face a second surface of the connecting path,
    wherein a distance from the nozzle ring to the nozzle link plates along the axial direction is greater than a distance from the free end surfaces of the nozzle vanes to the second surface of the connecting path along the axial direction, and
    wherein a gap is formed between the free end surfaces of the nozzle vanes and the second surface of the connecting path when the nozzle link plates are urged away from the nozzle ring by the biasing force of the one or more biasing members.

3. The turbine according to claim 2, wherein the gap spaces apart the nozzle vanes entirely from the second surface of the connecting path, when the biasing force urges the nozzle link plates away from the nozzle ring.

4. The turbine according to claim 2, wherein the one or more biasing members are configured to urge the nozzle link plates away from the nozzle ring near the nozzle shafts, to form the gap between the free end surfaces of the nozzle vanes and the second surface of the connecting path.

5. The turbine according to claim 1,
    wherein the nozzle link plates include a first region overlapping with the nozzle vanes and a second region not overlapping with the nozzle vanes, when viewed in the axial direction, and
    wherein the one or more biasing members are in contact with the nozzle link plates in the first region.

6. The turbine according to claim 1, wherein the one or more biasing members include a plurality of coil springs that contact the nozzle vane members, respectively, wherein the coil springs extend coaxially with the nozzle shafts of the respective nozzle vane members.

7. The turbine according to claim 1, wherein the one or more biasing members are disposed between the nozzle ring and the nozzle link plates, to urge the nozzle vanes toward the main surface of the nozzle ring.

8. The turbine according to claim 1, wherein the nozzle vane members are urged toward a surface of the nozzle ring when the nozzle link plates are urged away from the nozzle ring by the biasing force of the one or more biasing members.

9. The turbine according to claim 8, wherein the nozzle vane members are caused to abut against the surface of the nozzle ring by the biasing force.

10. The turbine according to claim 1, wherein the nozzle vanes are caused to abut against the main surface of the nozzle ring when the nozzle link plates are urged away from the nozzle ring by the biasing force of the one or more biasing members.

11. A turbine comprising:
    a turbine wheel to rotate around a central axis of the turbine;
    a housing formed around the turbine wheel, the housing including a flow path to convey a gas, and a connecting path extending between the flow path and the turbine wheel;
    a variable geometry device to guide a passage of the gas through the connecting path, wherein the variable geometry device includes:
        a nozzle vane member having a nozzle vane located in the connecting path, a nozzle shaft extending in an axial direction from the nozzle vane, and a nozzle link plate that is rotationally fixed with the nozzle shaft;

a nozzle ring located between the nozzle vane and the nozzle link plate, wherein the nozzle ring forms a through hole to rotatably accommodate the nozzle shaft; and a drive support that pivotally supports the nozzle link plate; and a biasing member that is in contact with the nozzle link plate to urge the nozzle vane member against a contact surface of the nozzle ring.

12. The turbine according to claim 11, wherein the contact surface of the nozzle ring faces the connecting path.

13. A turbocharger comprising the turbine according to claim 11.

14. The turbine according to claim 11, wherein the biasing member is configured to urge the nozzle link plate away from the nozzle ring.

15. The turbine according to claim 14, wherein the nozzle link plate is urged away from the nozzle ring near the nozzle shaft, by the biasing member.

16. The turbine according to claim 11, wherein the biasing member is positioned between the nozzle ring and the nozzle link plate to urge the nozzle vane against the contact surface of the nozzle ring.

17. The turbine according to claim 11, wherein the biasing member includes a coil spring that contacts both the nozzle ring and the nozzle link plate.

18. The turbine according to claim 11,
wherein the nozzle ring has a main surface that forms a first surface of the connecting path,
wherein the nozzle vane has a rear surface facing the first surface of the connecting path, and a free end surface located opposite the rear surface, the free end surface facing a second surface of the connecting path, and
wherein the biasing member is configured to urge the nozzle link plate in a direction that forms a gap between the free end surface of the nozzle vane and the second surface of the connecting path.

19. The turbine according to claim 18, wherein the free end surface of the nozzle vane is entirely spaced apart from the second surface of the connecting path, when the nozzle link plate is urged against the contact surface of the nozzle ring.

20. The turbine according to claim 11,
wherein the nozzle shaft has a distal end located opposite the nozzle vane,
wherein the distal end projects from a rear surface of the nozzle link plate,
wherein the nozzle link plate has an additional surface that faces in a different direction than a facing direction of the rear surface, and
wherein the biasing member contacts the additional surface of the nozzle link plate.

* * * * *